United States Patent
Loveless

(10) Patent No.: US 9,755,951 B2
(45) Date of Patent: Sep. 5, 2017

(54) FINANCIAL NETWORK

(71) Applicant: CFPH, LLC, New York, NY (US)

(72) Inventor: Jacob Loveless, New York, NY (US)

(73) Assignee: CFPH, LLC, New York, NY (US)

( * ) Notice: Subject to any disclaimer, the term of this patent is extended or adjusted under 35 U.S.C. 154(b) by 120 days.

(21) Appl. No.: 14/753,899

(22) Filed: Jun. 29, 2015

(65) Prior Publication Data

US 2016/0065448 A1    Mar. 3, 2016

Related U.S. Application Data

(60) Provisional application No. 62/019,366, filed on Jun. 30, 2014.

(51) Int. Cl.
| | |
|---|---|
| *H04L 12/707* | (2013.01) |
| *G09C 1/00* | (2006.01) |
| *G06Q 40/04* | (2012.01) |
| *H04L 12/24* | (2006.01) |
| *H04L 12/26* | (2006.01) |
| *H04L 12/803* | (2013.01) |
| *H04L 29/12* | (2006.01) |

(52) U.S. Cl.
CPC ............ *H04L 45/22* (2013.01); *G06Q 40/04* (2013.01); *G09C 1/00* (2013.01); *H04L 41/0668* (2013.01); *H04L 43/18* (2013.01); *H04L 47/125* (2013.01); *H04L 61/2517* (2013.01); *H04L 61/2567* (2013.01)

(58) Field of Classification Search
None
See application file for complete search history.

(56) References Cited

U.S. PATENT DOCUMENTS

| | | | | |
|---|---|---|---|---|
| 5,831,558 A | * | 11/1998 | Harvell | H03M 7/3088 341/106 |
| 7,843,907 B1 | * | 11/2010 | Abou-Emara | H04L 47/6205 370/386 |
| 8,589,575 B2 | * | 11/2013 | Ramachandra | H04L 29/12207 709/227 |
| 8,887,265 B2 | * | 11/2014 | Green | H04L 63/029 709/203 |
| 9,009,830 B2 | * | 4/2015 | Cothrell | H04L 63/1408 726/23 |
| 2002/0083344 A1 | * | 6/2002 | Vairavan | H04L 29/12009 726/13 |
| 2002/0167952 A1 | * | 11/2002 | Watson | G06F 11/2033 370/401 |
| 2004/0177158 A1 | * | 9/2004 | Bauch | H04L 29/06 709/245 |

(Continued)

OTHER PUBLICATIONS

Notification of Transmittal of the International Search Report and the Written Opinion of the International Searching Authority for PCT/US2015/038324; dated Sep. 16, 2015; 8 pages.

*Primary Examiner* — Ayaz Sheikh
*Assistant Examiner* — Faiyazkhan Ghafoerkhan
(74) *Attorney, Agent, or Firm* — Mark Miller

(57) ABSTRACT

A network system that facilitates financial transactions. A software defined network may operate to provide a variety of trading related services to a variety of customers with a low latency. Core or processor affinity for routing processes may improve speeds of routing. Data capture through a shared memory space may allow for a variety of analytics without introducing unacceptable delay.

10 Claims, 19 Drawing Sheets

(56) References Cited

U.S. PATENT DOCUMENTS

| | | | |
|---|---|---|---|
| 2010/0138534 A1* | 6/2010 | Mutnuru | H04L 43/0817 709/224 |
| 2010/0217955 A1* | 8/2010 | Conte | G06F 9/5066 712/29 |
| 2010/0226383 A1* | 9/2010 | Cothrell | H04L 63/1408 370/401 |
| 2010/0325257 A1* | 12/2010 | Goel | H04L 29/12028 709/223 |
| 2011/0161626 A1* | 6/2011 | Mangione-Smith | G06F 15/7825 712/29 |
| 2012/0036244 A1* | 2/2012 | Ramachandra | H04L 29/12207 709/223 |
| 2013/0269021 A1* | 10/2013 | Green | H04L 63/029 726/12 |
| 2013/0304927 A1* | 11/2013 | Abu-Amara | H04L 61/1511 709/227 |

* cited by examiner

FINANCIAL NETWORK

CROSS REFERENCE TO RELATED APPLICATION

This application claims priority to U.S. provisional application 62/019,366 filed Jun. 30, 2014, which is hereby incorporated herein by reference.

FIELD

Some embodiments relate to communication network elements.

BACKGROUND

A communications network may include one or more network elements to facilitate the communication of data, for example, between computing devices.

SUMMARY

Figure 1A:
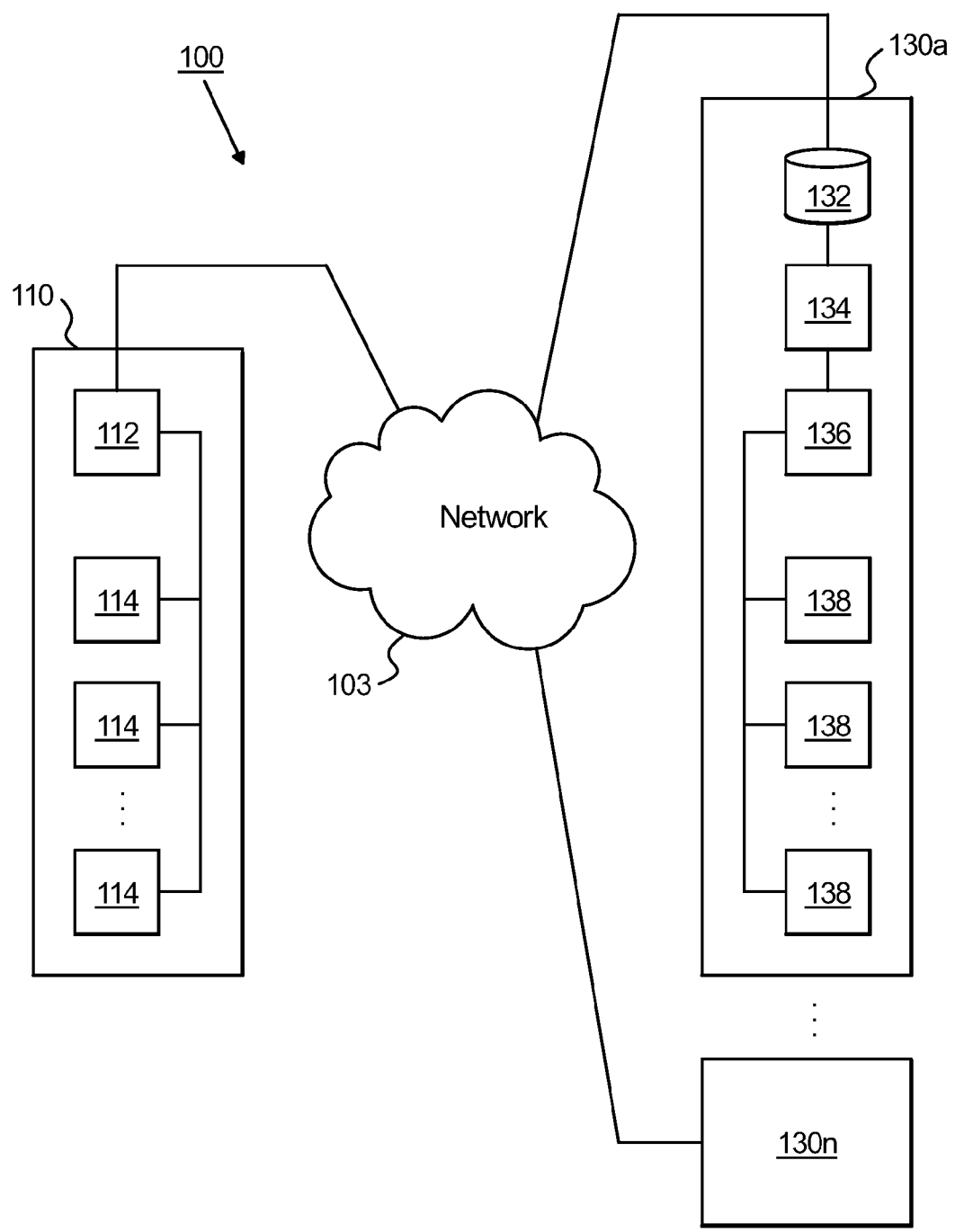
FIG. 1A shows an example system according to some embodiments.

The following should be understood as embodiments and not claims.

A. An apparatus comprising: a first routing device configured to map a local address and port pair of a first network to a destination on a second network and to map a local address and port pair of a third network to the destination on the second network, in which the first routing device is configured such that a first core of a first processor is configured to perform routing for the first network, and a second core of the first processor is configured to perform routing for the second network; in which, to facilitate mapping the local address and port pair of the first network to the destination, the routing device is configured to open a first socket to the destination, open a second socket to a second destination, and fail over routing to the second socket in response to a determination that the first socket has failed; in which a third core of the routing device is configured to execute a process configured to access a portion of a memory space shared with the first core, copy at least one of a packet header and an entire packet from the portion of the memory space, and facilitate transmission of the at least one of the packet header and the entire packet to an analytics engine coupled to the first routing device.

A.1. The apparatus of claim A, in which the first routing device is configured to load balance traffic sent to the local address and port pair between to such that the traffic is split between the destination using the first socket and the second destination using the second socket. A.1.1. The apparatus of claim A.1, in which the load balancing occurs in at least one of a round robin and a least connected manner. A.2. The apparatus of claim A, in which the routing device include multiple multi-core processors. A.3. The apparatus of claim A, in which the routing device is configured to route data at Gigabit speeds.

A.4. The apparatus of claim A, comprising: a second routing device configured to map an address and port pair to the first network and to map a second address and port pair to the second network, in which the second routing device is configured such that a first core of a second processor is configured to perform routing to the first network from the destination and a second core of the second processor is configured to perform routing to the second network from the destination. A.4.1. The apparatus of claim A.4, in which the first routing device is configured to compress blocks of data routed to the destination according to a dictionary scheme, and the second routing device is configured to decompress the blocks of data according to the dictionary scheme for transmission to the destination. A.4.2. The apparatus of claim A.4, in which mapping through the first routing device from the first network and second network enables services from the first network and second network to a software defined network. A.4.3. The apparatus of claim A.4, in which the second routing device enables the destination to subscribe to services offered to a software defined network from the first network and second network. A.4.4. The apparatus of claim A.4, in which the first routing device and the second routing device define a software defined network that spans a plurality of data centers. A.4.5. The apparatus of claim A.4, in which the destination includes a trading customer and the first network includes a network on which an electronic exchange resides.

DETAILED DESCRIPTION

Referring to FIG. 1A, there is shown an example system 100. System 100 may include a plurality of entities, including entity 110 and a plurality of entities 130*a*-*n* (one of which is shown in detail in FIG. 1A), one or more of which may be interconnected via network 103. Entity 110 may be, for example, a service provider that provides services, and each entity 130 may be, for example, a customer/user (e.g., companies, banks, investment funds, trading firms, etc.) of the services provided by service provider 110. For description purposes only, entity 110 will be referred to herein as a service provider and entity(s) 130 will be referred to as a user(s)/customer(s). Nonetheless, these terms are intended to be non-limiting and other example entities are possible. In addition, entity 110 being a service provider that provides services to entities 130 is also an example and other relationships between entities 110 and 130 are possible.

As one example, service provider 110 may provide one or more electronic marketplaces for the trading/buying-selling/matching of items (such as, for example, financial instruments, real-estate, bets/wagers, tangible goods, services, etc.) and as such, may provide one or more electronic matching/trading engines. Similarly, customers 130 may seek to trade one or more items on the electronic marketplace(s) provided by service provider 130. According to this example, one or more of customers 130 may electronically communicate data/messages, for example, to service provider 110 including, for example, orders to buy and/or sell items at specified prices and/or quantities (e.g., bids, offers, hits, takes). Similarly, service provider 110 may electronically receive and execute such orders and communicate data/messages to customers 130 including, for example, prices and quantities of pending and executed orders. One skilled in the art will recognize that this is merely an example and that other and/or additional services may be provided by service provider 110 and that additional and/or other messages/data may be transferred between services provider 110 and customers 130. For example, one or more of customers 130 may electronically communicate data/messages, for example, to service provider 110 including, for example, orders to back or lay a team or event, etc. at specified odds and/or stakes. Similarly, service provider 110 may electronically receive and execute/match such orders and communicate data/messages to customers 130 including, for example, specified odds and/or stakes of pending and/or executed orders.

Service provider 110 may include one or more network elements 112, and one or more computing systems 114 (which may include/or be connected to one or more database systems) that provide services, for example, to customers 130. One skilled in the art will recognize that service provider 110 may include additional and/or other computing systems, and/or network elements. Computing systems 114 may be referred to herein as servers for purposes of description. However, it should be understood that the use of the term server is non-limiting, and that other types of computing systems may be used. One or more of servers 114 may include one or more processors and one or more memories. One or more of servers 114 also may include one or more network hardware/software/firmware based interfaces/ports that enable the servers to connect to network elements 112 and thereby network 103. Such interfaces may be configured to support one or more different types of physical network connections, such as copper, fiber optic, and/or wireless, may be configured to support one or more different types of protocols, such as Ethernet, and may be configured to operate at any speed, such as Gb rates. One skilled in the art will recognize that servers 114 may have additional and/or other configurations. Service provider 110 may also include one or more software and/or firmware and/or hardware based applications that may be stored on one or more database systems and/or servers 114, and be configured to execute on one or more of servers 114. Each server may execute the same or different applications. As one example, the application(s) may be configured to provide one or more electronic matching/trading engines for the trading/matching of one or more items as described herein.

Network element(s) 112 may include, for example, one or more routers and/or switches including, for example, core and/or edge routers and/or switches. Each of network elements 112 may include one or more network hardware/software/firmware based interfaces/ports that enable the network elements to connect to one another, one or more of servers 114, and/or network 103. Such interfaces may be configured to support one or more different types of physical network connections, such as copper, fiber optic, and/or wireless, may be configured to support one or more different types of protocols, such as Ethernet, and may be configured to operate at any speed, such as Gb rates. One skilled in the art will recognize that network elements 112 may have additional and/or other configurations. One or more of network elements 112 may contain one or more physical connections (wired/wireless) to each other, servers 114, and/or network 103. Network elements 112 and one or more of servers 114 may be further configured such that one or more of servers 114 have private network addresses and thereby reside on a private network of service provider 110, and/or have public addresses and thereby reside on a public network. In this fashion, network elements 112 may be configured such that servers 114 may communicate with one another and/or with network 103 and thereby with one or more other computing systems, for example, connected to network 103, such as computing system(s) 138 of customers 130. One skilled in the art will also recognize that network elements 112 may include additional and/or other elements as described herein, and may provide additional and/or other type of functionality than described herein.

An example customer 130 (as shown by customer 130a) may include one or more network elements 132, 134, and 136, and one or more computing systems 138 (which may include/or be connected to one or more database systems). One skilled in the art will recognize that a customer 130 may include additional and/other computing systems, and/or network elements. One skilled in the art will recognize that other customers 130 may include similar and/or other configurations as that of customer 130a shown in FIG. 1A. Computing systems 138 may be referred to herein as servers for purposes of description. However, it should be understood that the use of the term server is non-limiting, and that other types of computing systems may be used. One or more of servers 138 may include one or more processors and one or more memories. One or more of servers 138 also may include one or more network hardware/software/firmware based interfaces/ports that enable the servers to connect to one or more of network elements 132-136 and thereby network 103. Such interfaces may be configured to support one or more different types of physical network connections, such as copper, fiber optic, and/or wireless, may be configured to support one or more different types of protocols, such as Ethernet, and may be configured to operate at any speed, such as Gb rates. One skilled in the art will recognize that servers 138 may have additional and/or other configurations. Customer 130 may also include one or more software and/or firmware and/or hardware based applications that may be stored on one or more database systems and/or servers 138, and be configured to execute on one or more of servers 138. Each server may execute the same or different applications. As one example, the application(s) may be configured to use the services provided by server(s) 114 of service provider 110 and in particular, may be configured to trade one or more items with one or more other customers 130, for example, through the use of electronic matching/ trading engine(s) provided by server(s) 114 of service provider 110. According to this example, one or more of servers of 138 of customer 130 may electronically communicate via network 103 data/messages, for example, to servers 114 of service provider 110 including, for example, orders to buy and/or sell items at specified prices and/or quantities (e.g., bids, offers, hits, takes). Similarly, servers 114 of service provider 110 may electronically receive and execute such orders and communicate data/messages to servers 138 of customer 130 including, for example, prices and quantities of pending and executed orders. One skilled in the art will recognize that this is merely an example and that other and/or additional services may be provided by service provider 110 and that additional and/or other messages/data may be transferred between service provider 110 and customers 130, as described herein Network element(s) 132-136 of customer 130 may include, for example, one or more routers and/or switches including, for example, core and/or edge routers and/or switches. Each of network elements may include one or more network hardware/software/firmware based interfaces/ ports that enable the network elements to connect to one another, to one or more of servers 138, and/or network 103. Such interfaces may be configured to support one or more different types of physical network connections, such as copper, fiber optic, and/or wireless, may be configured to support one or more different types of protocols, such as Ethernet, and may be configured to operate at any speed, such as Gb rates. One skilled in the art will recognize that network elements 132-136 may have additional and/or other configurations. One or more of network elements 132-136 may contain one or more physical connections (wired/ wireless) to each other, to one or more of servers 138, and/or network 103. Network elements 132-136 may be further configured such that one or more of servers 138 have private network addresses and thereby reside on a private network of a respective customer 130, and/or have public addresses and thereby reside on a public network. In this fashion, network elements 132-136 may be configured such that servers 114 may communicate with one another and/or with network 103 and thereby with one or more other computing systems, for example, connected to network 103, such as servers 114. One skilled in the art will also recognize that network elements 132-136 may include additional and/or other elements as described herein, and may provide additional and/or other type of functionality than that described herein.

Network 103 may include one or more network elements including, for example, one or more routers and/or switches. Such network elements may include one or more network hardware/software/firmware based interfaces/ports that may be configured to support one or more different types of physical network connections, such as copper, fiber optic, and/or wireless, may be configured to support one or more different types of protocols, such as Ethernet, and may be configured to operate at any speed, such as Gb rates. One or more elements of network 103 may contain one or more physical connections (wired/wireless) to each other and to each of entity 110 and entities 130. In this fashion, network 103 may be configured such that computing systems 114 of entity 110 and computing systems 138 of entity(s) 130 may communicate with at least one another. Network 103 may be configured as a public and/or private network(s). One skilled in the art will also recognize that network 103 may include additional and/or other network elements as described herein, and may be configured in additional and/or fashions than described herein.

Figure 1B:
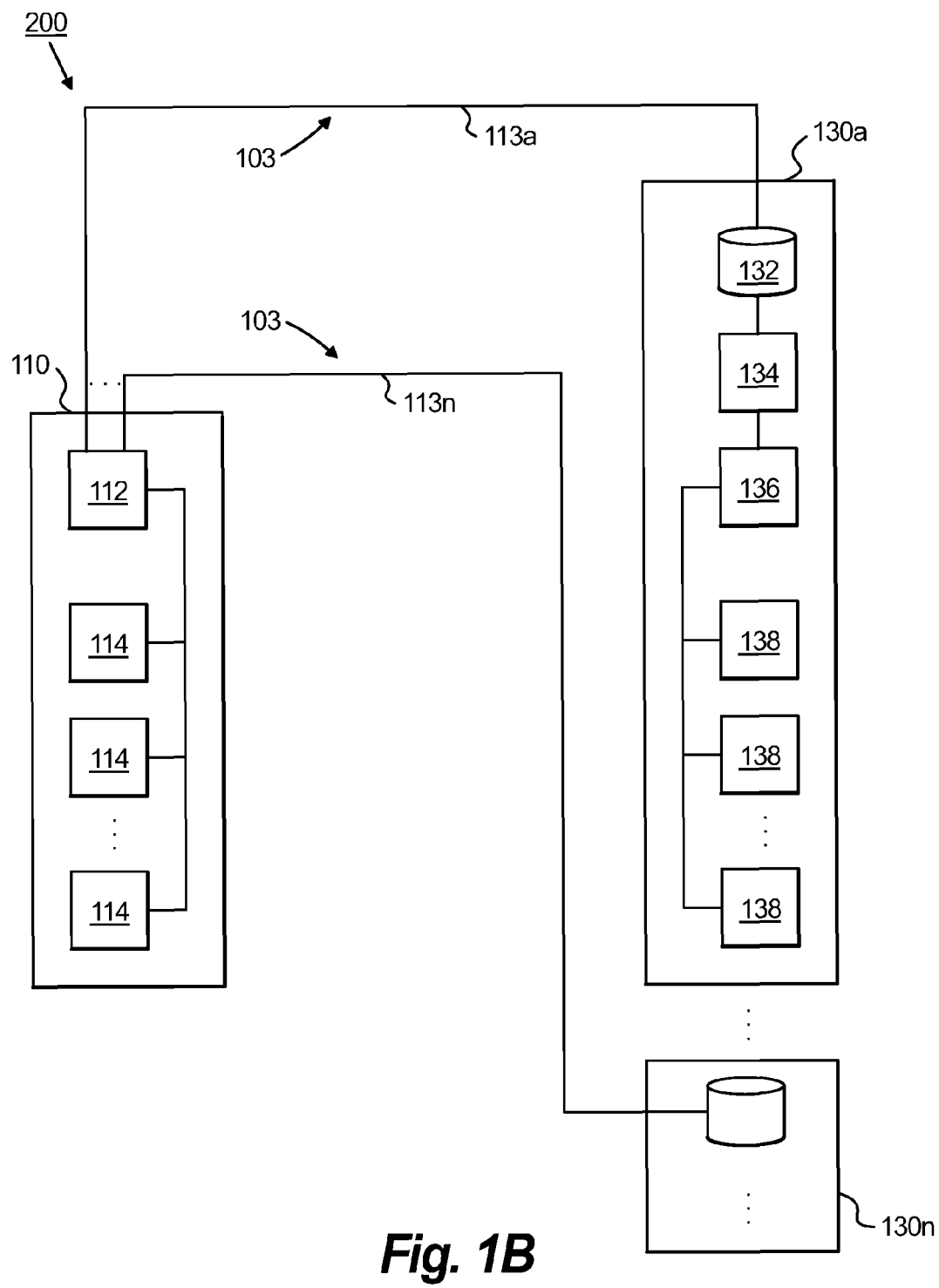
FIG. 1B shows an example configuration of the system of FIG. 1A.

Turning to FIG. 1B where similar reference numbers refer to similar elements as described herein, there is shown a system 200 which may be an example configuration of system 100 of FIG. 1A. According to this example, network elements 112 of service provider 110 may include a switch, such as a core switch, that includes one or more connections to each of servers 114. As an example, network element 112 may be an Arista 7124 application switch although other and/or additional network elements may be used. Network element 112 and one or more of servers 114 may be further configured such that one or more of servers 114 have network addresses on network 103, which address(es) may be referred to as "public" address(es) (although the address(es) may not actually be public). According to an example aspect of example system 200, network 103 may be a private network (possibly owned or leased) of service provider 110. According to this example, network element 112 and one or more of servers 114 would be part of network 103. In other words, the network interfaces of network element 112 that interface servers 114 and that also interface customers 130 may be on the same address space.

According to a further aspect of this example configuration of FIG. 1B, network element 136 of an example customer 130 (as shown by customer 130a) may include a switch, such as a core switch, network element 134 may be a switch, such as an edge switch, and network element 132 may be a router. Switch 136 may include one or more connections to each of servers 138 and one or more connections to switch 134. In turn, switch 134 may include one or more connections to router 136. Network elements 132- 136 and one or more of servers 138 may be further configured such that one or more of servers 138 have private network addresses (i.e., addresses not on network 103) and thereby reside on a private network separate from network 103. Other customers 130n may have similar configurations.

According to a further aspect of this example configuration of FIG. 1B, each customer 130 may have one (possibly more) addresses on network 103, which address(es) may be referred to as "public" address(es) (although the address(es) may not actually be public). Accordingly, each router 132 may also be configured as a network address and possibly port address translator (NAT/PAT) that maps between one or more private addresses of servers 138 on the customer 130 network and the public address assigned to the respective customer 130 on network 103, for example. Accordingly, when a server 138 is communicating a message/data (which may be encapsulated in a packet that includes addresses and/or ports for example) to a server 114, router 136 may translate a private address of server 138 in the packet to the public address assigned to customer 130 on network 103. Again, such translation may also include translating a port number being used by an application on server 138 to another port number. Similarly, when a server 114 is communicating a message/data (which may be encapsulated in a packet that includes addresses and/or ports for example) to a server 138, router 136 may translate the public address assigned to customer 130 in the packet to the private address of server 138. Again, router 136 may also perform port translation as part of the address translation.

According to a further aspect of this example configuration of FIG. 1B, network 103 may include point to point connections 113a-n (although again, non-point to point connections are possible) between switch 112 of service provider 110 and each of routers 132, for example, of customers 130. For example, each connection between switch 112 of service provider 110 and a router 132, for example, of a customer 130 may be a fiber connection such as a single mode fiber connection, running at 1 Gb, 10 Gb, 100 Gb, etc. for example (although other types of connections and rates may be used). According to a still further aspect of this example configuration, one or more of: servers 114 and network element 112 of service provider 110, and network elements 132-136 and servers 138 of respective customers 130 may be co-located, such as in the same room. For example, one or more of servers 114 and network element 112 may reside in one rack. Similarly, one or more of network elements 132-136 and servers 138 of a first respective customer 130 may reside in another respective rack, etc. One skilled in the art will also recognize that system 200 may include additional and/or other elements than those described herein, and may include additional and/or other configurations than those described herein.

One example problem that may occur with example system 100 and 200 as shown in FIGS. 1A and 1B is that significant delays may be introduced when data is communicated between servers 114 and servers 138. As a specific example, router 132 may introduce delays (e.g., greater than a 100 us) as result of, for example, the network/port translation functionalities. Similarly, different routers 132 at different customers 130 may experience different delays.

Figure 2:
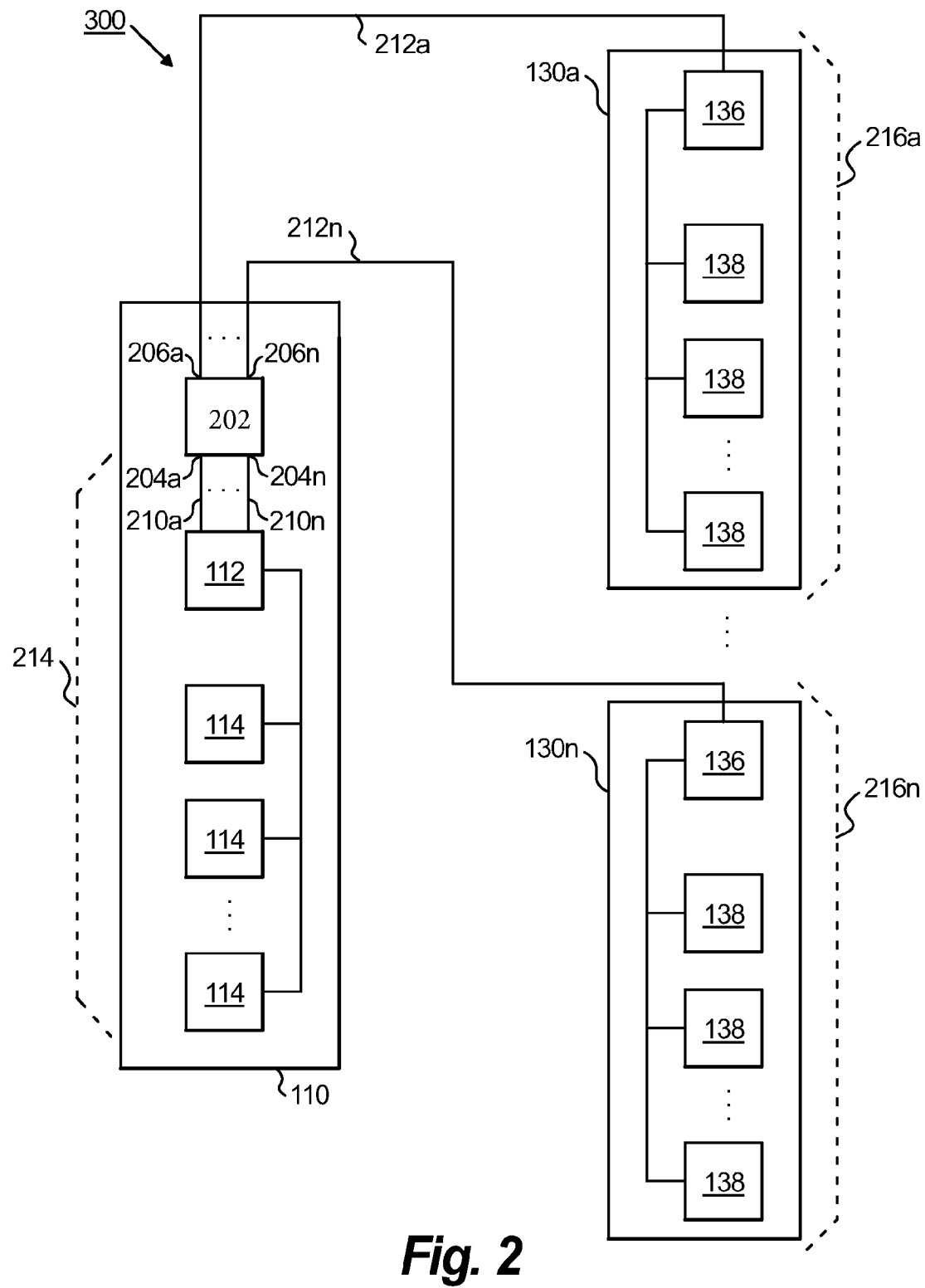
FIG. 2 shows another example system according to some embodiments.

Turning to FIG. 2 where similar reference numbers refer to similar elements as described herein, there is shown an example system 300 that is similar to the example system 200 of FIG. 1B. According to this example, system 300 includes network element 202. Network element 202 may be part of service provider 110 and as such, may be owned and/or operated by service provider 110. Network element 202 may be co-located with servers 114 of service provider 110 and/or one or more network elements, including network element 112, of service provider 110, and may reside in the same rack as these elements. One skilled in the art will recognize that network element 202 need not be owned and/or operated by service provider 110 and need not be co-located with the network elements and/or servers of service provider 110.

Network element 202 may include one or more network hardware/software/firmware based interfaces/ports 204a . . . 204n that enable the network element to connect to servers 114, possibly via network element 112, for example. Network element 202 may also include one or more network hardware/software/firmware based interfaces/ports 206a . . . 206n that enable the network element to connect to server(s) 138, for example, of respective customers 130a-n. The network interfaces 204a-n and 206a-n of network element 202 may be configured to support one or more different types of physical network connections, such as copper, fiber optic, and/or wireless, may be configured to support one or more different types of protocols, such as Ethernet, and may be configured to operate at any speed, such as Gb rates. Furthermore, different network interfaces 204a-n and 206a-n may have different configurations. One skilled in the art will recognize that network element 202 may have additional and/or other configurations.

As further shown in FIG. 2, one or more of network interface(s) 204a-n of network element 202 may be physically connected (wired/wirelessly), for example, by connection(s) 210a-n to network element 112, which may be a switch. According to another and/or additional example, one or more of network interface(s) 204a-n of network element 202 may each be physically connected by one or more connection(s) 210a-n directly to a respective server 114 of service provider 110. According to a further aspect of example system 300, each customer 130a-n may be allocated one or more respective network interfaces 206a-n of network element 202. Accordingly, each respective network interface 206a-n of network element 202 may be physically connected (wired/wirelessly), for example, by a connection 212a-n to a respective server 138 of a respective customer 130a-n either directly and/or via one or more network elements (such as network elements 136, which may be a switch for example) of a respective customer. For example, each connection 212a-n may be a fiber connection such as a single mode fiber connection, running at 1 Gb, 10 Gb, 100 Gb, etc. for example (although other types of connections and rates may be used). One skilled in the art will recognize that additional and/or other configurations of network element 202 and system 300 are possible.

According to a further aspect of example system 300, network interface(s) 204a-n of network element 202, connections 210a-n, network element 112, and one or more of servers 114 may reside on a network 214, which may be a private network of service provider 110 and have a network address space. Accordingly, network element 112 and one or more of servers 114 may be configured such that one or more of servers 114 have network addresses on network 214 within the network address space. According to a further aspect of this example configuration, network interface 206a, connection 212a, network element 136 of respective customers 130a, for example, and one or more of servers 138 of respective customers 130a may reside on a network 216a of customer 130a, which may be a private network of customer 130a and have a network address space. Accordingly, network element 136 and one or more of servers 138 of customer 130a may be configured such that the one or more of servers 138 have network addresses on network 216a within the respective network address space. Similarly, network interface 206n, connection 212n, network element 136 of customer 130n, for example, and one or more of servers 138 of customer 130n may reside on a network 216n of customer 130n, which may be a private network of customer 130n and have a respective network address space. Accordingly, network element 136 and one or more of servers 138 of customer 130n may be configured such that one or more of servers 138 of customer 130n have network addresses on network 216n within the respective network address space. Other customers 130 not shown in FIG. 2 may have similar configurations.

According to a further aspect of this example system, network element 202 may be, for example, a bi-directional network address and possibly port address translator (NAT/PAT). More specifically, according to this example, each customer 130a-n may have one (possibly more) addresses on network 214 within the network address space of network 214. Accordingly, for each customer 130a-n, network element 202 may be configured as a NAT/PAT that maps between one or more addresses of servers 138 on the respective customer network 216a-n (i.e., within the network address space of the respective network) and the address assigned to the respective customer 130a-n on network 214, for example, within the network address space of network 214. Accordingly, when a server 138 is communicating a message/data (which may be encapsulated in a packet that includes addresses and/or ports for example) to a server 114, network element 202 may translate an address on network 216a-n of server 138 in the packet to the address assigned to customer 130a-n on network 214. Again, such translation may also include translating a port number in the packet being used by an application on a server 138 to another port number. Similarly, when a server 110 is communicating a message/data (which may be encapsulated in a packet that includes addresses and/or ports for example) to a server 138, network element 202 may translate the address assigned to customer 130a-n on network 214 in the packet to the address of server 138 on network 216a-n. Again, network element 202 may also perform port translation as part of the address translation.

Figure 3:
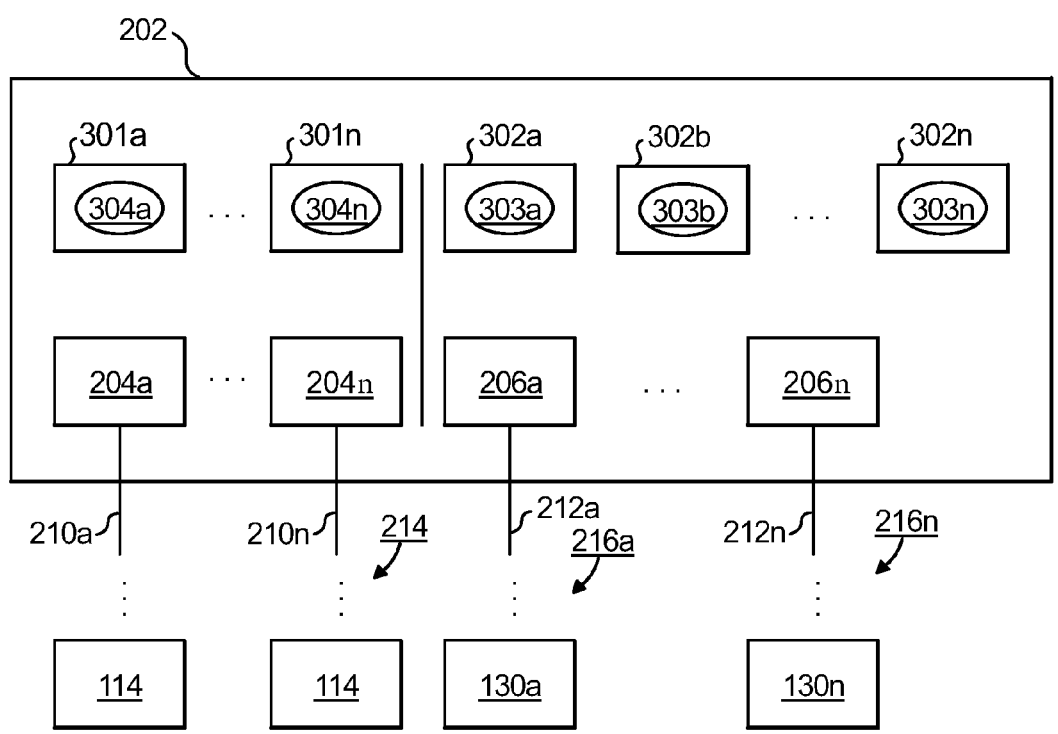
FIG. 3 shows an example network element according to some embodiments.

Turning to FIG. 3 where similar reference numbers refer to similar elements as described herein, there is shown an example architecture of network element 202. Network element 202 may include a plurality of computing processors, including one or more of processors 301a . . . 301n, and one or more of processors 302a, 302b, . . . , 302n. Processors 301a-n may be referred to herein as scheduling processors, and processors 302a-n may be referred to herein as network processors. The terms "scheduling" and "network" are intended to be non-limiting and are used herein for ease of discussion only. Each of processors 301a-n and 302a-n may or may not be similarly configured in terms of, for example, memory, processing speed, etc. One skilled in the art will recognize that network element 202 may include additional and/or fewer processors. According to a further aspect of example network element 202, any one or more of scheduling processors 301a-n and network processors 302a-n may be interconnected to one another through a communications architecture, such as a bus architecture, which may include for example, a shard memory architecture. One skilled in the art will recognize that other and/or additional communication architectures are possible. The communication architecture may be such that any of the scheduling processors 301a-n may be configured to communicate with any one of the network processors 302a-n. One skilled in the art will recognize that other configurations are possible.

Network element 202 may also include, as discussed herein, one or more network interfaces 204a-n that may be configured, for example, to interface directly or indirectly with servers 114, and one or more network interfaces 206a-n that may be configured, for example, to interface with respective customers 130a-n. Network interfaces 204a-n and 206a-n may have the same configuration and/or one or more different configurations. For example, interfaces 204a-n and 206a-n may be any combination of long range or short range, single mode or multi mode fiber interfaces running at 1 Gb, 10 Gb, 100 Gb, etc. rates, for example. One or more of network interfaces 204a-n and 206a-n may by physically situated on its own network interface card and/or several of network interfaces 204a-n and 206a-n may by physically situated on a common network interface card or cards. One skilled in the art will recognize that other configurations are possible.

As discussed herein, each network interface 206a-n may be allocated to and interface with a respective customer 130a-n. One skilled in the art will recognize that a given customer may be allocated multiple network interfaces (for example, for load balancing purposes, backup, etc.). According to a further aspect of example network element 202, each network interface 206a-n may be assigned/allocated to a respective one of the network processors 302a-n such that all data communicated over the respective network interface is only handled by the respective network processor. One skilled in the art will recognize, however, that additional and/or other configurations are possible including assigning two or more network interfaces 206a-n to a given network processor 302a-n and/or assigning a two or more network processors 302a-n to a given network interface 206a-n. According to a further aspect of example network element 202, a given network interface 206a-n may be interconnected to its respective network processor 302a-n through a communications architecture, such as a bus architecture, such as a PCIe bus architecture. One skilled in the art will recognize that other and/or additional communication architectures are possible. The communication architecture may be such that any network interface 206a-n may be configured to communicate with any one or more of the network processors 302a-n and vice versa. According to a further aspect of network element 202, each network processor 302a-n may be shielded from all interrupts other than, for example, interrupts from its associated network interface 206a-n. One skilled in the art will recognize that other configurations are possible.

As further shown in FIG. 3, example network element 202 may include one or more network applications 303a-n. Applications 303a-n may be software based applications, although other and/or additional configurations are possible including firmware and/or hardware based applications. Network element 202 may also include one or more memory devices on which applications 303a-n may be stored and/or from which the applications may execute. Such memory devices may be electronically connected to one or more of processors 301a-n and 302a-n. According to an aspect of network element 202, each network processor may execute an application 303a-n. According to a further aspect of network element 202, each application 303a-n may only execute on a respective processor. Hence, application 303a may only execute on processor 302a, application 303b may only execute on processor 302b, etc. This may be referred to as processor affinity. One skilled in the art will recognize, however, that additional and/or other configurations are possible including having multiple applications 303a-n execute on a single processor 302a-n and/or having one or more of applications 303a-n execute on multiple processors. For example, in some embodiments, a routing device may have core or processor affinity assigned at an 1-flow level.

As such, according to an example configuration of network element 202, a given network application 303a-n may be assigned/allocated to and execute on a respective network processor 302a-n, which may be assigned/allocated to a respective network interface 206a-n, which may be assigned/allocated to a respective customer 130a-n. According to a further aspect of this example configuration, each network application 302a-n may be configured as a NAT and possibly a PAT and perform network/port translation for messages/data passing between network 214 and a respective network 216a-n of a respective customer 130a-n. Accordingly, network element 202 may be configured (such as by a network administrator) to assign/allocate a given network interface 206a-n to a given network processor 302a-n and be further configured such that the network application 303a-n on each network processor performs NAT/PAT functions based on the customer 130a-n to which the assigned interface is connected. According to the physical hardware configuration/layout of network processors 302a-n and network interfaces 206a-n and/or the amount of data being generated by each respective customer 130a-n and/or sent to each respective customer, certain assignments/allocations of network interfaces 206a-n to network processors 302a-n may be more beneficial than others in terms of total data throughput of network element 202 and be assigned accordingly, such as by an administrator. For example, it may beneficial to allocate a given network interface 206a-n to a near network processor 302a-n. One skilled in the art will recognize that network applications 302a-n need not be configured as NAT/PAT and that one network application may be configured to perform different functions than another network application, etc.

According to a further aspect of example network element 202, each network interface 204a-n may be assigned/allocated to a respective one of the scheduling processors 301a-n such that all data communicated over the respective network interface is only handled by the respective scheduling processor. One skilled in the art will recognize, however, that additional and/or other configurations are possible. For example, all network interfaces 204a-n may be assigned/allocated to one of the scheduling processors 301a-n and/or each of the scheduling processors may be configured to communicate with any one or more of network interfaces 204a-n. According to a further aspect of example network element 202, a given network interface 204a-n may be interconnected to a respective scheduling processor(s) 301a-n through a communications architecture, such as a bus architecture, such as a PCIe bus architecture. One skilled in the art will recognize that other and/or additional communication architectures are possible. The communication architecture may be such that any network interface 204a-n may be configured to communicate with any one or more of the scheduling processors 301a-n and vice versa. According to a further aspect of network element 202, one or more of scheduling processors 301a-n may be shielded from all interrupts other than, for example, interrupts from one or more of network interfaces 204a-n. One skilled in the art will recognize that other configurations are possible.

As further shown in FIG. 3, network element 202 may also include one or more scheduling applications and/or one or more administration applications, which are shown collectively in FIG. 3 as applications 304a-n. Applications 304a-n may be software based applications, although other configurations are possible including firmware and/or hardware based applications. As discussed, network element 202 may also include one or more memory devices on which applications 304a-n may be stored and/or from which the applications may execute. According to one example of network element 202, each scheduling processor 301a-n may execute one or more scheduling applications, one or more administration applications, or a combination of both. As another example, a scheduling application and/or an administration application may execute on multiple processors. As another example, a scheduling application may execute on one scheduling processor 301a-n and be responsible for (as further discussed herein) a subset of network processors 302a-n, while another scheduling application may execute on another scheduling processor 301a-n and be responsible for a different subset of network processors 302a-n. As another example, a scheduling application may execute on one scheduling processor 301a-n and be responsible for all network processors 302a-n. As a further example, a scheduling application may execute on multiple scheduling processors 301a-n and be responsible for all network processors 302a-n. One skilled in the art will recognize that other variations are possible. For ease of description, network element 202 will be described herein as having one scheduling application and one administration application. One skilled in the art will recognize that network element 202 may include other types of applications than those described herein.

According to a further aspect of example network element 202, the scheduling application 304 may be configured to pass messages/data between network interfaces 206a-n and network interfaces 204a-n as follows:

a. For messages/data received on a network interfaces 206a-n, once the respective network application 303a-n has performed NAT/PAT translation on a respective packet, for example, scheduling application 304 may retrieve/obtain the translated packet and forward/communicate the translated packet onto/to one of network interfaces 204a-n.

b. For messages/data received on a network interfaces 204a-n, scheduling application 304 may obtain the messages/data, determine which of the respective network applications 303a-n is performing NAT/PAT translation for the respective packets, and forward/communicate the packets to that network application, where the packet may be translated (NAT/PAT) and forwarded/communicated onto/to the respective network interface 206a-n.

As such, according to an example operation of network element 202, a given server 138 of a given customer 130a-n may transmit a message/data (which may be encapsulated in a packet for example that includes addresses and/or ports) to a server 114 of service provider 110. That message/data/packet may be received at a given network interface 206a-n of network element 202. A given network application 303a-n of the network processor 302a-n that is assigned to that network interface 206a-n may then obtain/receive and/or be forwarded the message/data/packet (or portion thereof) from the network interface 206 and perform NAT/PAT translation on the respective packet. The network application 303a-n may then forward and/or make available the translated message/data/packet to the scheduling application 304 which in turn may then obtain and/or receive the translated message/data/packet, and then forward and/or make available the translated message/data/packet to a respective network interface 204a-n, where the message/data/packet may then be communicated to the server 114. Similarly, a given server 114 of service provider 110 may transmit a message/data (which may be encapsulated in a packet for example) to a server 138 of the customer 130a-n. That message/data/packet may be received at a given network interface 204a-n of network element 202. The scheduling application 304 may then obtain/receive and/or be forwarded the message/data/packet (or a portion thereof) from the network interface 204a-n, determine which of the respective network applications 303a-n/network processors 302a-n is performing NAT/PAT translation for that message/data/packet, and forward and/or make available the message/data/packet to that network application 303a-n (as one example, and other implementations are possible, in order for the scheduling application to forward messages/data to the correct network processor 302a-n, the scheduling application may maintain a table—which may be configured by an administrator—that maps network addresses associated with customers 130 to respective network processors 302a-n). The network application 303a-n in turn may obtain and/or receive the message/data/packet, perform NAT/PAT translation on the respective packet and forward and/or make available the translated message/data/packet to a respective network interface 206a-n that is assigned to the network processor 302a-n on which the network application 303a-n is executing. That network interface 206 may then communicate the message/data/packet to server 138 of the customer 130a-n. One skilled in the art will recognize that this is only an example, and other and/or additional example operations of network element 202 are possible. One skilled in the art will also recognize that operations performed by scheduling application 304 as described herein and operations performed network applications 303a-n as described herein may be performed in whole or in part by the other.

Regarding the communications between scheduling application 304 and any given network application 303a-n, as one example the two applications may communicate via one or more (e.g., two) shared memory circular queues. For example, a network application 303 may place a translated message from a network interface 206 into a first memory queue, and update indexes/pointers, for example, to the queue to reflect that another message is in the queue. Similarly, scheduling application 304 may monitor the indexes/pointers to the queue, recognize there is a new message in the queue, read the message out, and update the indexes/pointers, for example, to reflect that the message has been read out. Similarly, the scheduling application 304 may place a message from a network interface 204 into a second memory queue, and update indexes/pointers, for example, to that queue to reflect that another message is in the second queue. Similarly, network application 303 may monitor the indexes/pointers to the second queue, recognize there is a new message in the queue, read the message out, and update the indexes/pointers, for example, to reflect that the message has been read out. A similar process may be used for other network applications 303 (which may have their own set of queues) to communicate with scheduling application 304. One skilled in the art will recognize that this is merely an example and other communication techniques/processes may be used.

As discussed, network element 202 may also include an administration application 304 that may execute on a scheduling processor 301a-n, for example. Such an application may be used by an administrator to monitor the status of network element 202 and configure the network element. For example, network element 202 may include, for example, one or more input/output devices such as a display interface, mouse, keyboard, touch screen, network interface (for remote access) etc. Through the use of such interfaces and administration application 304, for example, an administrator may monitor the status of network element 202 and configure the network element. For example, an administrator may assign/allocate and/or re-assign/re-allocate a given network interface 206a-n to a given network processor 302a-n. The administrator may further configure the network application 303a-n of a given network processor 302 (e.g., as to the addresses and/or ports the network application 303 is translating between) according to the customer 130a-n that network application 303 is performing NAT/PAT translations on behalf of. One skilled in the art will recognize that a network application may be configured in other fashions. One advantage, for example, of the hardware/software configuration of network element 202 is that an administrator, for example, may reconfigure a given customer 130a-n (in terms of, e.g., the NAT/PAT configuration, in terms of which network processor 302a-n is assigned to the customer, and/or in terms of which network interface 206a-n is assigned to the network processor 302a-n and/or customer) without disrupting other customers. Administration application 304 may also include, for example, an IPMI subsystem so that an administrator can monitor the status of network element 202. Such a subsystem may also be separate from administration application 304. One skilled in the art will recognize that these are only example administrative functions, and other/additional functions are possible.

According to a further aspect of network element 202, the network element may also include one or more memory devices, such as solid state drives, and may include one or more logging applications that capture all (or part) of the data moving through the network element and log the data to the drives. According to a further aspect, the logging application may filter the data and store only portions of the data and/or may run analysis on the data (such as latency calculations) and store such analysis. According to a still further aspect, the logging application may filter the data (such as looking for market data prices, completed transactions, etc.) and/or perform analysis on the data and forward the filtered data and/or analysis onto another network interface(s) (e.g. different from network interfaces 204a-n and 206a-n). Other systems and users (like customers 130), external to network element 202, may receive such data and/or analysis, including receiving the data and/or analysis for a price. One skilled in the art will recognize that these are only example logging functions, and other/additional logging functions are possible.

According to an example implementation of network element 202, an Intel Sandy Bridge processor that includes a plurality of cores (e.g., 8) may be used to provide one or more of processors 301a-n and 302a-n. For example, for a given Sandy Bridge processor, one or more cores may be allocated as scheduling processors 302a-n and one or more cores may be allocated as network processors 303a-n. Such cores may be configured and operate as described herein for processors 301a-n and 302a-n. Network element 202 may also include a multiple Sandy Bridge Processors. Here, for each Sandy Bridge processor, one or more cores may be allocated as network processors 302a-n and one or more cores may be allocated as scheduling processors 301a-n (that may, for example, only work with the network processors of that chip for purposes of moving messages between network interfaces 204a-n and 206a-n). In such a configuration, any of network interfaces 206a-n may be allocated to any of the network processors (cores) of the Sandy Bridges. Alternatively, only certain network interfaces 206a-n may be allocated to one Sandy Bridge processor while another set of network interfaces 206a-n may be allocated to another Sandy Bridge processor, etc. Similarly, any of network interfaces 204a-n may be allocated to any of the scheduling processors (cores) of the Sandy Bridge processors. Alternatively, only certain network interfaces 204a-n may be allocated to one Sandy Bridge processor while another set of network interfaces 206a-n may be allocated to another Sandy Bridge processor, etc. One skilled in the art will recognize that these are merely examples, and that other configurations and other chip sets may be used.

According to a further example implementation of network element 202, network interfaces 204a-n and/or 206a-n may be provided through one or more network interface cards from Hotlava, for example, including any one or more of the Tambora 120G6, Tambora 64G6, Tambora 80G4, Tambora 64G4, and Bosavi 12G6. One skilled in the art will recognize that these are merely examples, and that other network interface cards, including those from other suppliers, may be used.

According to a further example implementation of network element 202, the Sandy Bridge processor(s), for example, and network interface cards from Hotlava, for example, may be inserted onto a single motherboard and such system may run a the Linux operating system. Again, one skilled in the art will recognize that these are merely examples, and that other configurations are possible.

One skilled in the art will recognize that network element 202 may also be configured (e.g., while also being configured as discussed herein in FIGS. 2 and 3) in a reverse direction. For example, a given server 114 on network 214 may have one (possibly more) addresses on another network, such as network 216a, although some other network interfaced to a network interface 206 is possible. Accordingly, for given server 114, network element 202 may be configured as a NAT/PAT (as discussed herein) that maps between one or more addresses of server 114 on customer network 214 and the address assigned to the server on network 216a, for example.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. Routing devices that define and/or enable a software defined network may reside at a data center and/or at a costumer and/or service provider as desired in various embodiments. For example, an edge routing device of an SDN may provide 1-flow routing, a switch or edge routing device of a customer or service provide may provide such functionality and so on.

Some embodiments may include a software defined network. Such a network may use a high speed networking device such as one disclosed herein (e.g., a device such as device 202). Such a network may enable a cloud and/or distributed financial network with a high degree of flexibility and speed. In some embodiments, a software defined network may include a carrier grade network translation system.

For endpoints of the SDN, the SDN may perform a NAT (with headers) of packets and/or may support port level redirection (Port Address Translation) as desired—acting as a proxy between one or more external networks and one or more internal SDN IP zones. This design may help reduce routing and help to ensure that external network changes can occur without requiring any downstream routing changes. In some embodiments there may be one internal SDN IP zone per datacenter spanned by the SDN. An 1-flow may be defined as an IP and port pair accessible from a source. An SDN may provide routing, analytics, load balancing, failover, and so on services to a service provider identified by a specific 1-flow.

At the customer network, the SDN may appear as a simple server connection with static routes. For example, a customer connection to the SDN may be similar to that described above with respect to a connection through network device 202. As other endpoints are enabled (for example FIX endpoints, market data endpoints and/or internal services), the customer facing SDN endpoint may present these services on different ports or IPs as defined by the customer network (e.g., as 1-flows).

Failover and load balancing may be handled at the application layer and can be defined on a per IP and Port set called a logical flow (1-Flow). This allows for fine grain control of application level failover and load balancing by elevating network failover to the application level.

The SDN may act as a proprietary connectivity layer used to power a global network. Unlike traditional network systems such an SDN may interact with systems at both network and application levels. Endpoints may connect using standard IPv4 TCP/IP settings like a traditional server. Once connected, the SDN can then be configured to provide a myriad of transfer, analytics, load balancing and failover options on a per IP and Port pair known as an 1-Flow.

The SDN may use 1 Gbe, 10 Gbe Single Mode Fiber (SMF) connections for each endpoint in some embodiments. It should be recognized as above that any type of connection may be used in various embodiments and that these examples are non-limiting. The SDN endpoint (on the SDN side) can be configured with one or many IP addresses from any address space that suites the external network. In some embodiments, an SDN endpoint may have the following requirements: each SDN endpoint must be assigned (at least) 1 static IPv4 address and each SDN endpoint must be provided (at least) 1 default gateway. It should be recognized that while examples are given in terms of IPv4 and TCP, other examples may use any desired technology, such as IPv6 and UDP, etc.

Connectivity to and/or from an SDN may terminate or originate from the IP address assigned to the external connection by means of full Network Address Translation of an 1-flow IP and port pair by the SDN.

Figure 5:
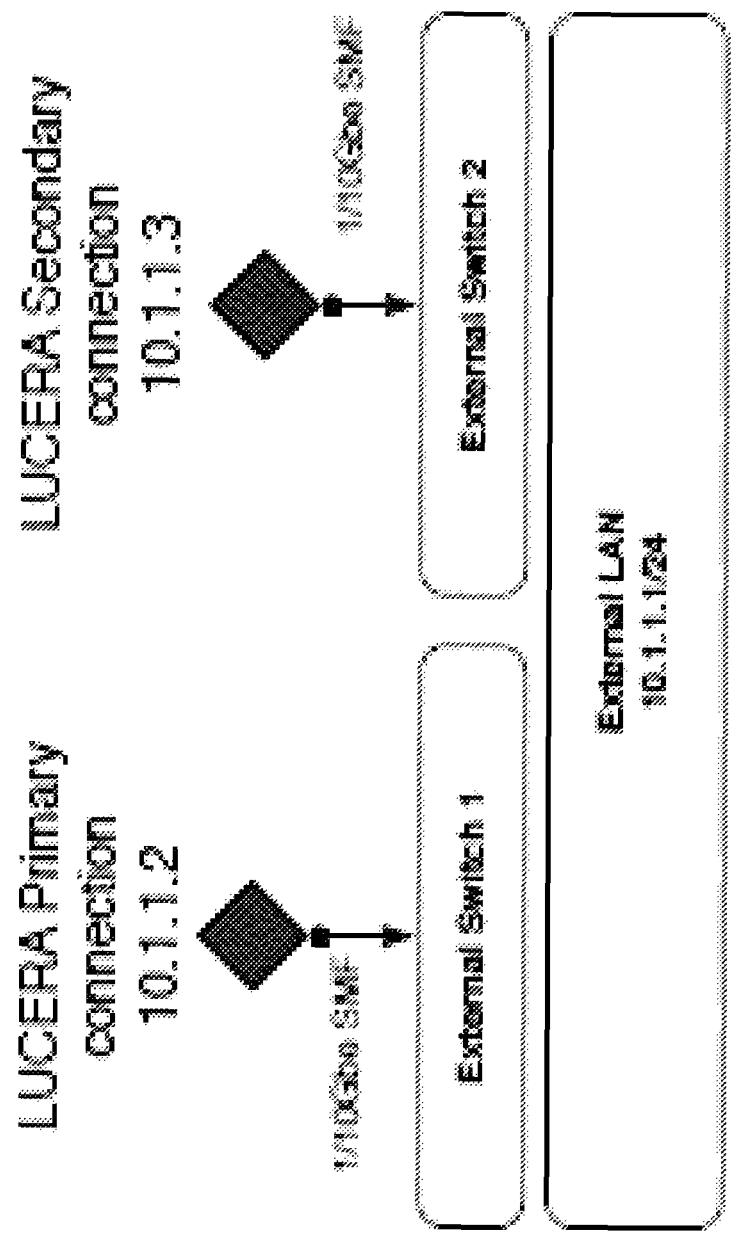
FIG. 5 shows an aspect of an example SDN according to some embodiments.

SDN endpoints may be directly connected to the external primary and/or secondary switches or other elements of a connected user/service provider. This configuration may facilitate a reduction in some forms of latency. FIG. 5 illustrates an example of a LUCERA SDN endpoint connection to external switches of an external LAN. In some embodiments, there is no additional routing layer between the application servers and the SDN. In this configuration each endpoint may be assigned an IP address from the external IP pool, and the SDN endpoint may be configured much like a traditional server network interface.

Figure 6:
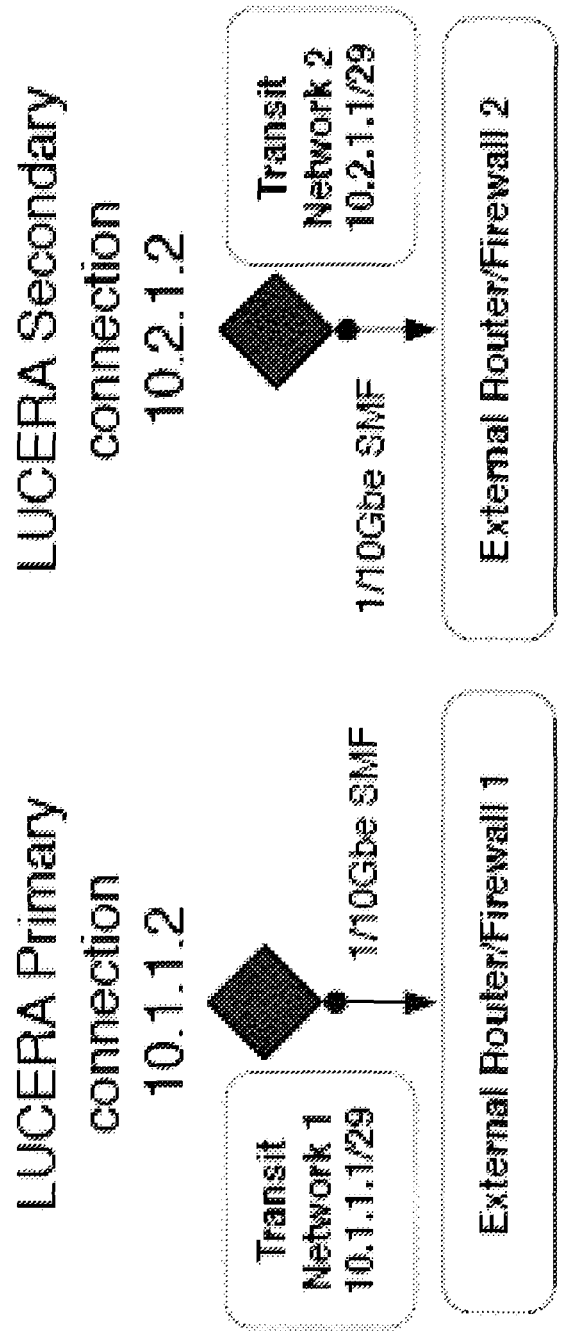
FIG. 6 shows an aspect of an example SDN according to some embodiments.

In some implementations, an SDN endpoint may be connected to an external firewall or router. This configuration is similar to the above configuration except the IP addresses are assign from a transit network. FIG. 6 illustrates an example of such a connection. This topology may be deployed to create a DMZ or to allow for VLAN consolidation. If there are additional source routes required (if the external transit does not perform a full NAT) they can be added to the SDN endpoint as well.

Figure 7:
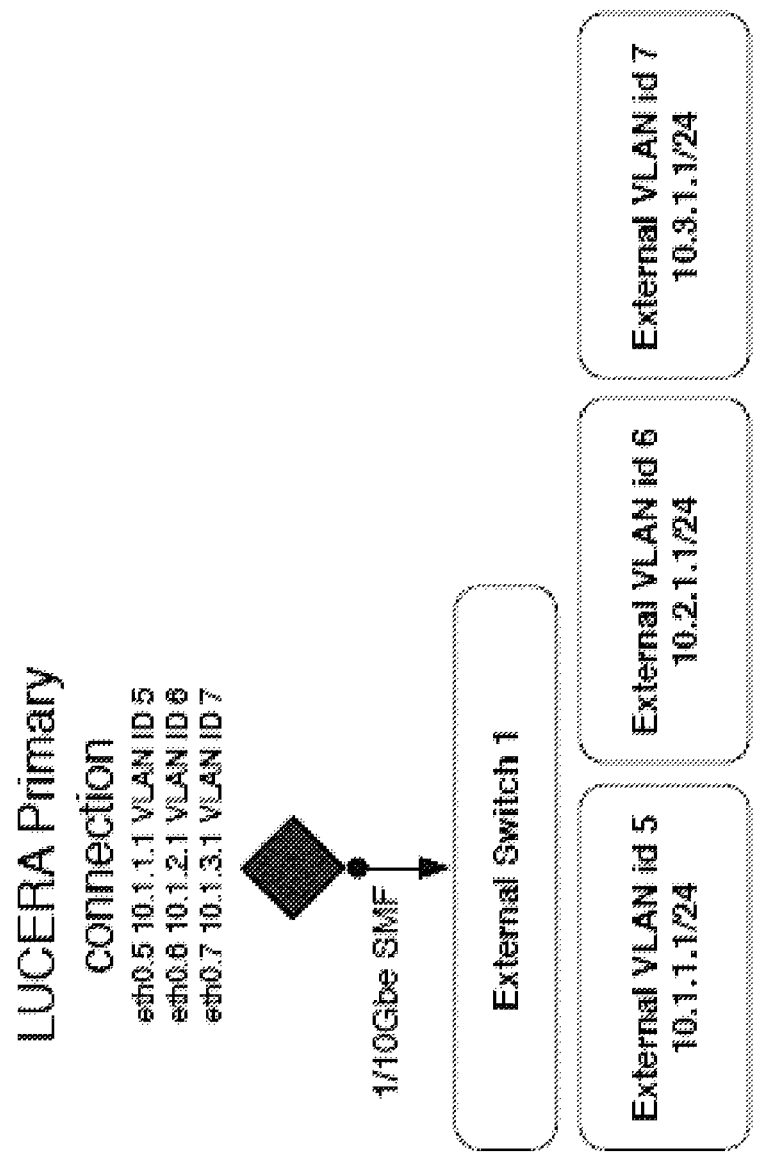
FIG. 7 shows an aspect of an example SDN according to some embodiments.

If a desire is to connect the SDN to multiple VLANs, some embodiments may employ the direct connection topology above and add the endpoint to each VLAN. FIG. 7 illustrates an example SDN endpoint that is configured to connect to three separate 802.1Q tagged VLANs. In some embodiments, the endpoint can support, for example, up to 1024 VLAN endpoints per physical connection. The SDN endpoint allows for this flexibly to adapt to the external network, and can be viewed as either a single gateway or a collection of gateways in a network.

Figure 8:
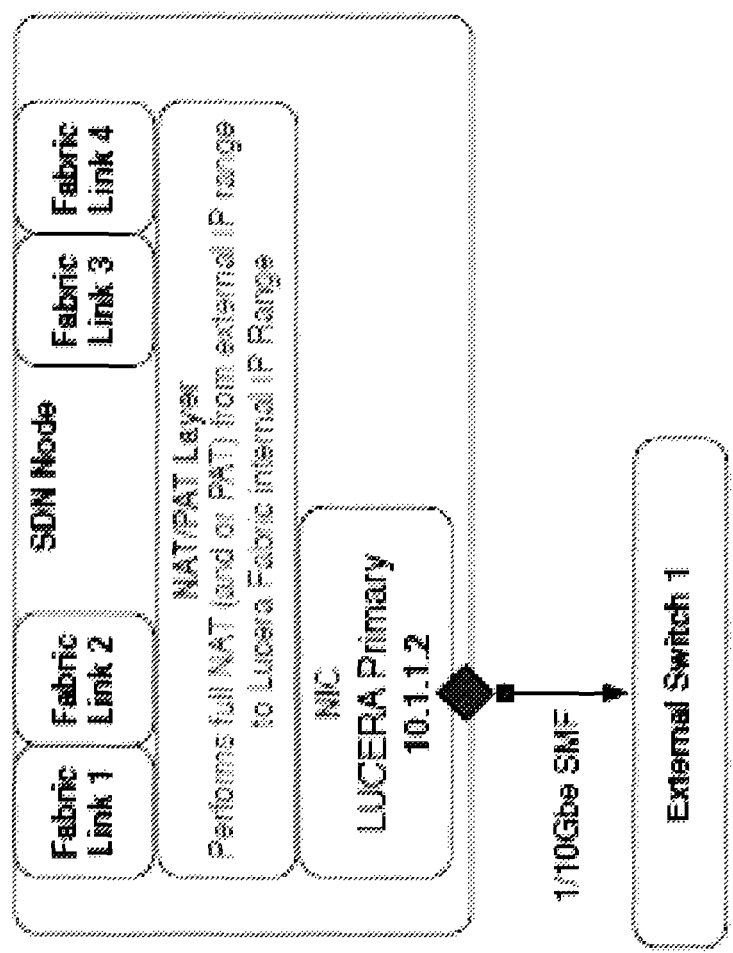
FIG. 8 shows an aspect of an example SDN according to some embodiments.

In some embodiments, an SDN may operate as a Carrier Grade Network Address Translation system. Each physical endpoint on the SDN may map to a physical network interface and each logical IP address may attach to that interface. FIG. 8 shows an SDN node and the external interface and the corresponding internal fabric connections. In some embodiments, the element of FIG. 8 may correspond to a network element such as element 202 described above.

In some embodiments, the SDN endpoint may perform a full (header rewrite) Network Address Translation to connect to the core fabric. For each 1-Flow there may be one process (and/or core and/or processor) assigned to perform and manage the NAT and/or PAT services. Each external connection may be directly connected to a single interface and the NAT layer may prevent traffic from being viewed on an external network.

Figure 9:
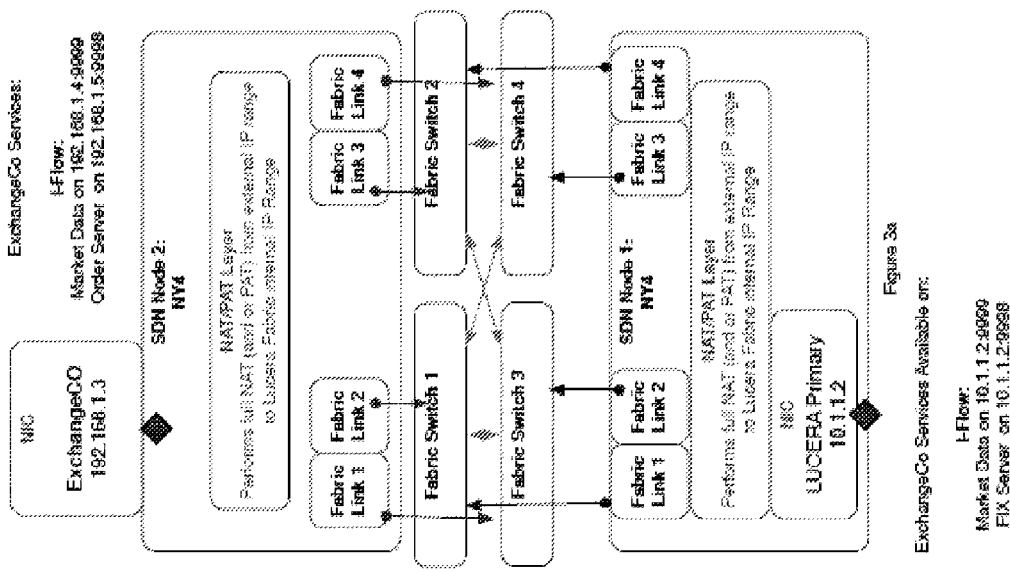
FIG. 9 shows an aspect of an example SDN according to some embodiments.

In some embodiments, by default, the interface may be reachable from a ping (ICMP echo) and no other ports. As applications are made available to the SDN (as 1-Flows) the ports on the external interface may become enabled. FIG. 9 illustrates an example scenario in which an endpoint of a customer has access to two services from ExchangeCo: a market data feed on port 9999 and a FIX session on 9998. These two services each have a separate 1-flow defined by the IP and port pairs. The SDN performs a full NAT of ExchangeCO networks and presents the services on the local endpoint on port 9999 and 9998. The ports may also be changed if desired. For example, the SDN could present the ExchangeCO services on 9000 and 9001 if required. Inside, the SDN may employ a non-blocking congestion free fabric and internal communication may occur over the private fabric IP zone. In some embodiments, cross datacenter connections (including e.g., redundant transcontinental lines) operate as edge node points, and can support internal 1-Flows.

In some embodiments, SDN endpoints may allow access to any number of 1-flows. For a given service (which may be identified as a set of IP, port and/or protocol) the SDN defines an 1-Flow to manage access, failover and/or quality of service. The SDN may manage these elements of operation in a manner that is not visible to the user accessing the 1-flow. 1-Flows may be defined as being ingress or egress. An ingress 1-Flow may be a service which is external to the SDN and provided into the SDN. An egress 1-Flow may be a service which is internal to the SDN and provided out to an external endpoint.

Figure 10:
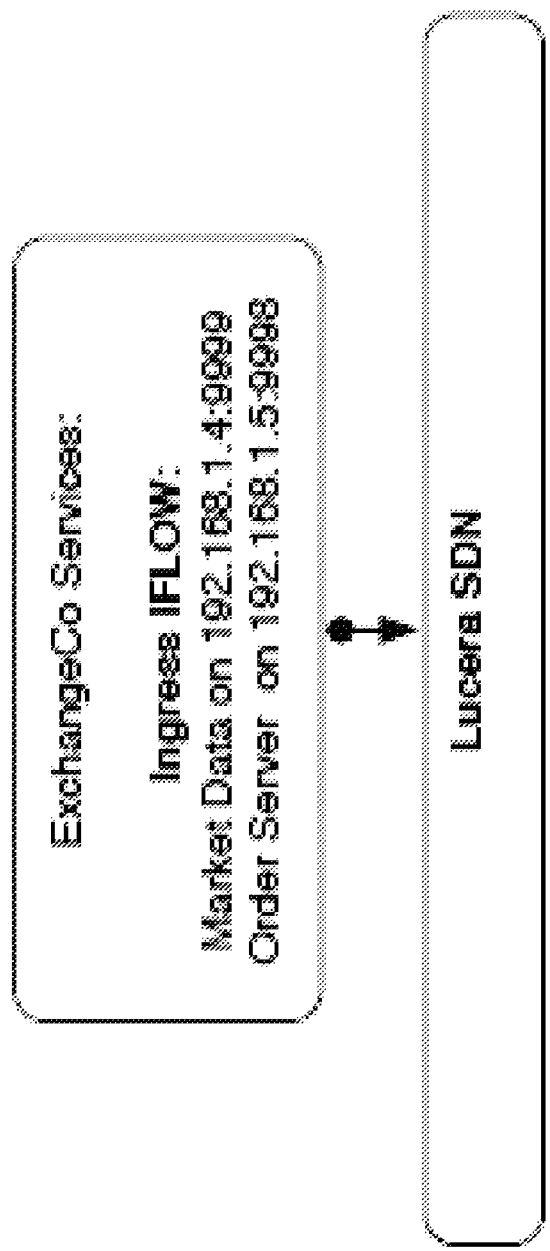
FIG. 10 shows an aspect of an example SDN according to some embodiments.

FIG. 10 illustrates an example ingress i-flow being enabled. In this example, A FIX engine on ExchangeCo's network wants to provide access to the SDN customers to their market. ExchangeCO defines the 1-Flow as the following: Market Data on IP: 192.168.1.1, Port: 9999, Protocol TCP; Order Session on IP: 192.168.1.2, Port 9998, Protocol TCP.

Figure 11:
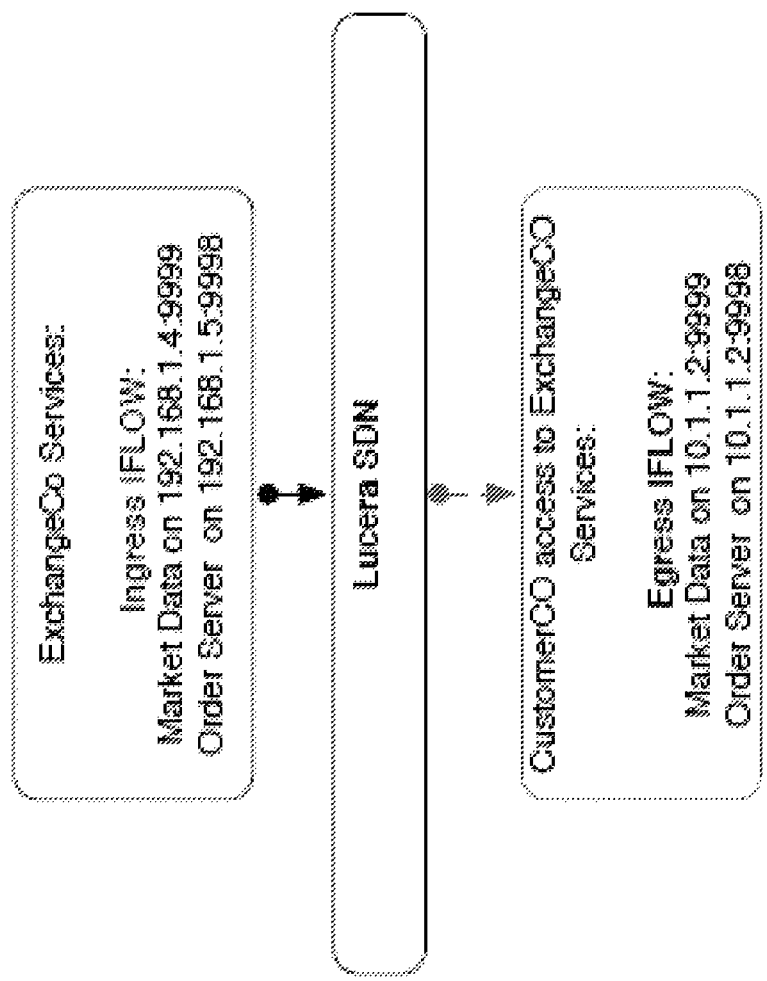
FIG. 11 shows an aspect of an example SDN according to some embodiments.

FIG. 11 illustrates a customer having an egress 1-flow for access to the ExchagneCo services. If CustomerCo wishes to access the ExchangeCO service, and having negotiated with ExchangeCo for credentials and having access approved by ExchangeCo the SDN then enables an 1-Flow for the service for the customer. The ExchangeCO services appear (source IP) on the local CustomerCO LAN (or VLAN) and CustomerCO does not need to know the details of the actual ExchangeCO endpoint. This abstraction may allow ExchangeCO to change network settings without enforcing downstream routing updates, failover and load balancing to be performed without an interruption to a customer connection to ExchangeCo, and so on.

Figure 12:
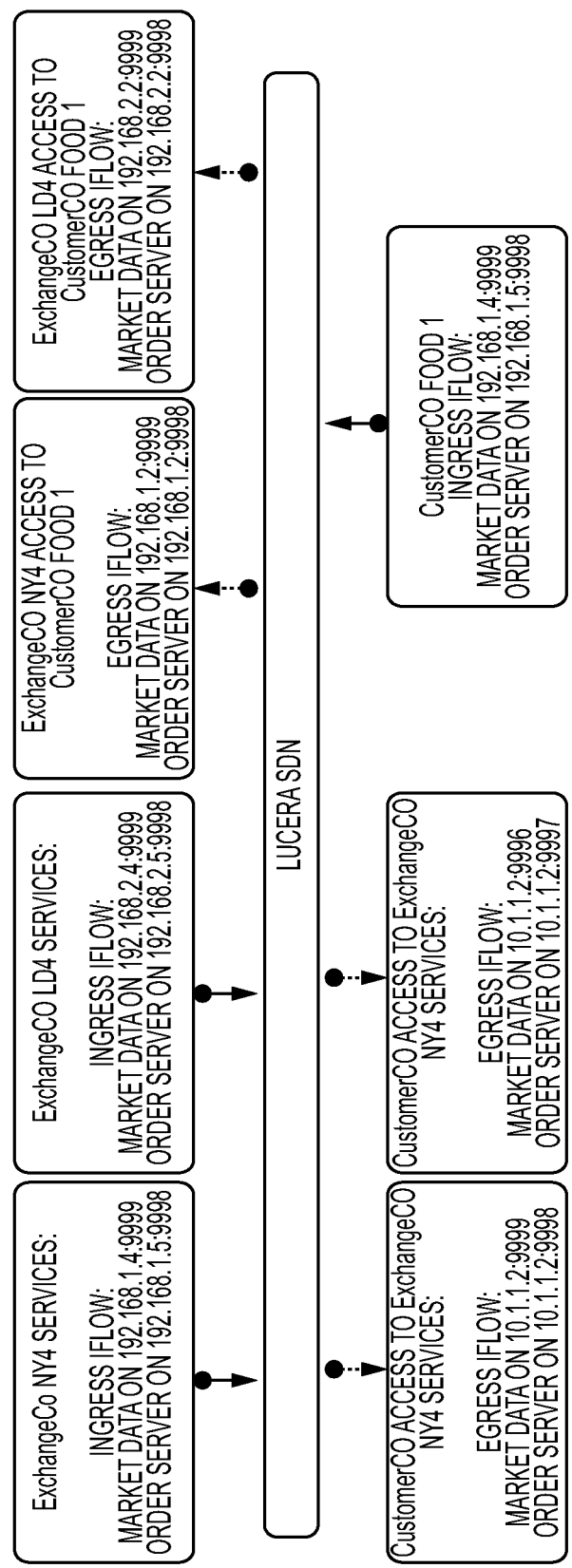
FIG. 12 shows an aspect of an example SDN according to some embodiments.

In some embodiments, 1-Flows may also change ports (Port Address Translation). In some embodiments 1-flows may traverse a cross data center fabric. For example, in the example of FIG. 12, CustomerCO wishes to access two FX matching sources as a taker of liquidity (egress 1-Flow) and 2 FX matching sources as a provider of liquidity (ingress 1-Flow).

Figure 13:
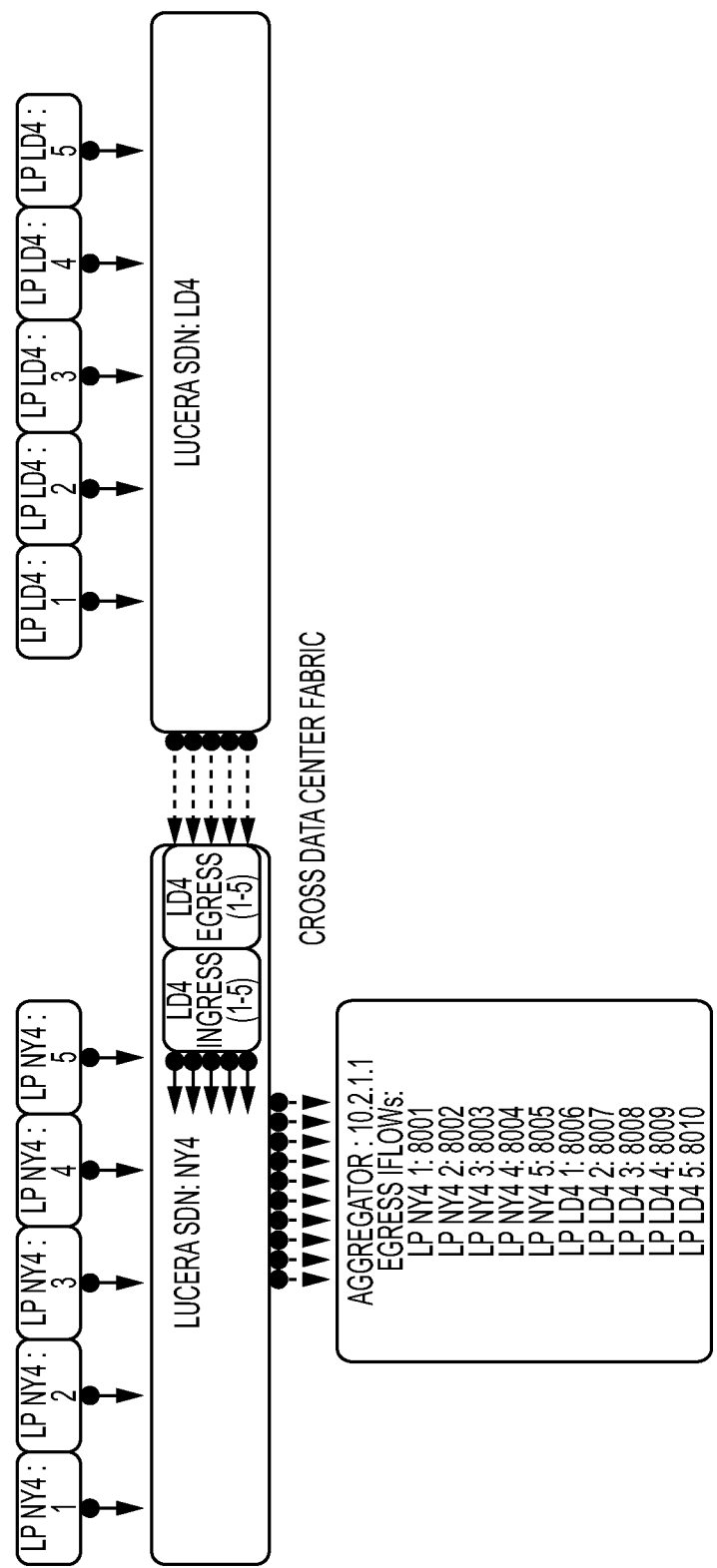
FIG. 13 shows an aspect of an example SDN according to some embodiments.

As an additional example, FIG. 13 shows a liquidity aggregator that desires to connect to six liquidity providers through the SDN in NY4 (which may identify a particular datacenter) and five liquidity providers in LD4 (which may identify a geographically disparate data center). In order to simplify the connectivity on the aggregator side, all destinations may be reached on a single IP address (shown here as 10.2.1.1). For each destination, an outbound port may be defined sequentially, so all 10 endpoints appear on a single IP with each port mapping to a logical endpoint.

Figure 14:
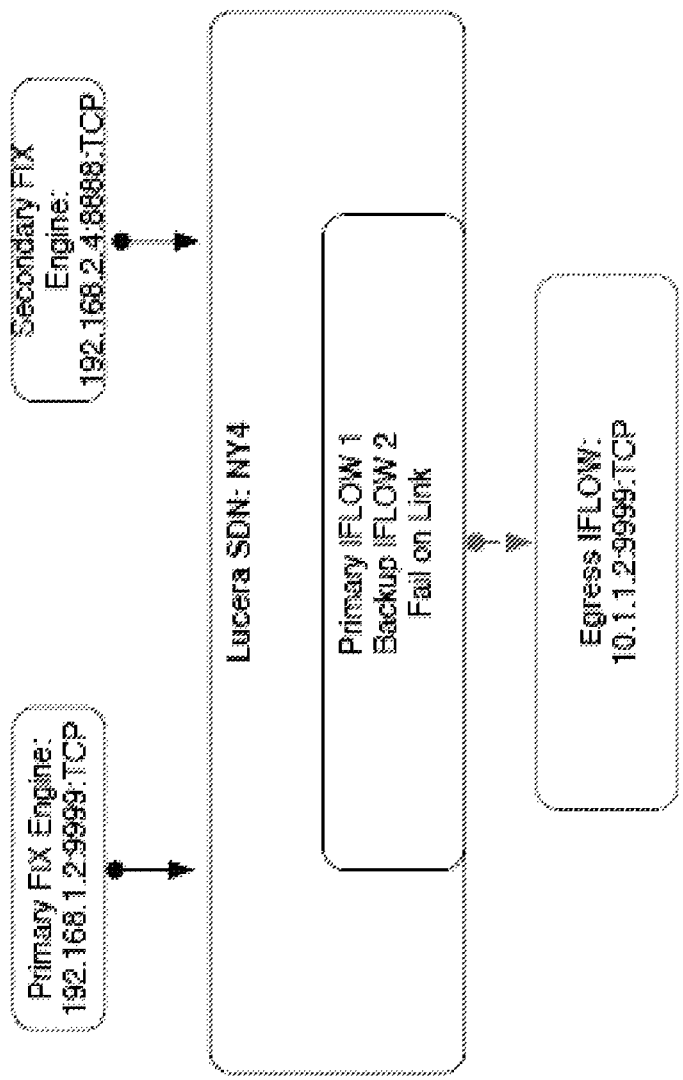
FIG. 14 shows an aspect of an example SDN according to some embodiments.

The SDN may operate as a traditional network appliance, in that it can detect failure at the link level and IP level. For example, let us define the following ingress 1-Flow that is visible n FIG. 14:

TABLE 1

| FIX Engine 1: 1-flow | IP | Port | Protocol |
|---|---|---|---|
| Primary | 192.168.1.2 | 9999 | TCP |
| Secondary | 192.168.2.4 | 8888 | TCP |

The 1-Flow may operate in an Active/Passive scenario and failover on link (physical) or IP failure. A socket may be opened to establish each of these 1-flows. A failed state may occur in either 1-flow if a socket is disrupted. If a primary socket is disrupted, the secondary 1-flow may be used in its place. Since the secondary socket is open before a fail state occurs, there is no delay in establishing a new connection after a failure is detected.

A customer using this 1-Flow as egress may transparently failover on to the secondary path without any change to networking from the customer's point of view. In this example scenario, on link failure to primary, the primary session would fail and the 1-flow would begin routing to the secondary link (if this is a FIX engine a new session instance may be initiated). Of note, the failure detection logic sits with the egress 1-Flow. On failure downstream (primary), the egress 1-Flow will receive an IP layer error and disconnect the session and re-establish the connection (stateful service) using the secondary. In some implementations, failover methods assume a stateful endpoint and on failure register a TCP reconnect.

Failover and Load Balancing may be similarly treated by the SDN. Failover and/or load balancing may be applied at an ingress and/or egress 1-flow. A load balanced service may be implemented in many ways. Two non-limiting examples may include: Round Robin (with or without weights) and Least Connected.

Figure 15:
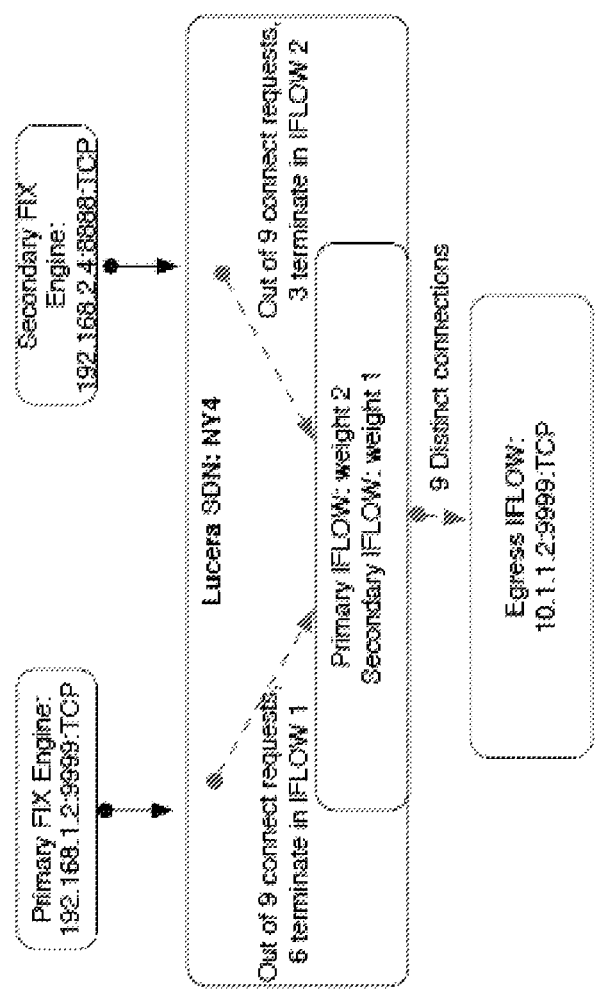
FIG. 15 shows an aspect of an example SDN according to some embodiments.

When Round Robin balancing is employed, each server may be used in turns, according to their weights. This may be the simplest and most often implemented load balancing method. Round Robin weights can be applied to direct traffic to more computationally robust server. In some implementation the number of endpoints in the pool may limited to, for example, 1024, meaning there can be up to 1024 'servers' to balance an 1-Flow across. FIG. 15 illustrates an example of a two server load balance with round robin and weights. Packets entering the illustrated egress 1-flow are routed among the two ingress 1-flows to a primary or secondary fix engine according to a round robin weighed algorithm implemented by the SDN endpoint.

In a least connected load balancing example, the server with the least amount of currently connected sessions is chosen. This load balancing method may be most appropriate for services which have uneven computational loads and the connection length is variable (for example database services or web services).

In some embodiments, compression may be applied to an ingress and/or egress 1-flow. Such compression may take any desired form. One example compression that may be used includes a dictionary type compression. One example of such a dictionary style compression that may be used includes a compression algorithm related to the DEFLATE algorithm, such as a zlib library compression algorithm. One of ordinary skill of art will recognize that other types of compression algorithms may be used in various embodiments.

Compression may be helpful to reduce latency and/or improve bandwidth in some circumstances by reducing and/or minimizing packet size and/or eliminating the transmission of extra data. This may be especially true for large message updates and/or text based 1-flows (e.g., FIX messaging 1-flows).

Compression and/or decompression may occur at an SDN level in some embodiments. A dictionary may be shared/established between and/or among processes/processors/cores. An API or other manner of establishing control for the 1-flow may be used to indicate to a process the style and manner of compression. For example, upon establishment of an SDN connection for a new 1-flow with a SDN endpoint, a dictionary for compression may be established that conforms to a desired compression routine. The dictionary may be shared with SDN endpoints that have access to the 1-flow. Data entering that 1-flow one endpoint may be compressed according to the compression routine. Data exiting the 1-flow may be decompressed according to the compression routine. A process at the endpoints may perform the compression and/or decompression according to the stabled routine (e.g., by executing instruction by a processor/core such as those in element 202.

Figure 16:
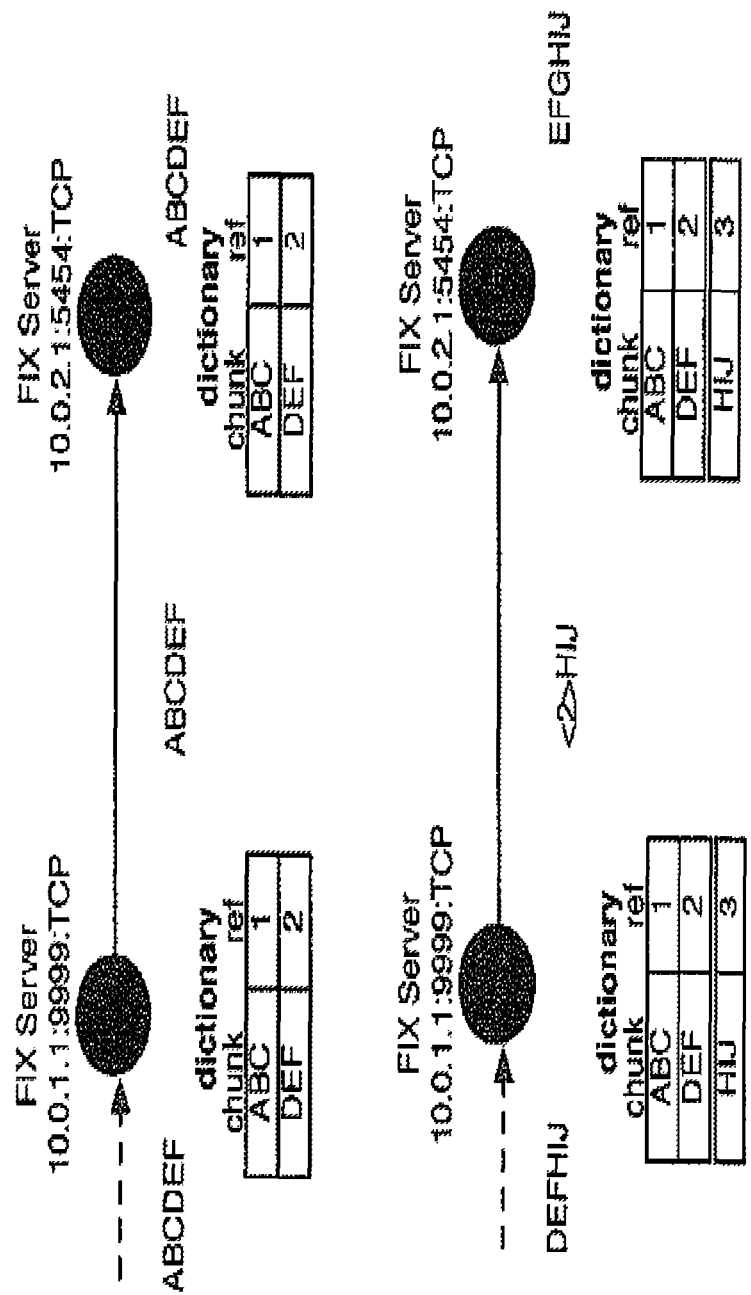
FIG. 16 shows an aspect of an example SDN according to some embodiments.

FIG. 16 illustrates an example instance of compression through an 1-flow. In this example, for each chunk of data (e.g., 2048 bytes or some other amount of data) a dictionary entry is created on both the sender and receive endpoints of an 1-flow. The dictionary is created in an ongoing manner rather than a pre-established or pre-shared manner. The method of establishing the dictionary entries may be predefined across endpoints so both endpoints generate the same dictionary entries. Other implementations may use a pre-established or pre-shared dictionary rather than an ongoing dictionary.

On an initial transfer of a particular chunk of data, a dictionary entry in made for that chunk on the transferring end. A performance hit may be experienced to create the entry because additional processing may be required compared to simply transmitting the data without creating the dictionary entry. In the example, at a receiving endpoint, the first chunk may be ABC. The dictionary entry created establishes ABC as a first entry. The second chunk of data may be DEF. The dictionary entry created establishes DEF as the second entry. The data is transmitted as ABCDEF to the other endpoint, where matching dictionary entries are created.

On a subsequent transfer, the particular chunk of data may compress down to a smaller size. For example, a 2048 byte chunk of data may compress down to a 10 byte reference identifying a dictionary entry. In the example, upon a receive of a new string of data that includes two chunks: DEF and HU, a receiving 1-flow converts the DEF chunk into a reference to the second dictionary entry and creates a new dictionary entry for the HU chunk as the third entry. The data transmitted to the other 1-flow endpoint then is a reference pointer to the second dictionary entry and the HU chunk. Upon receipt at the other endpoint, the endpoint looks up the second dictionary entry to recreate the DEF chunk to create the complete DEFHIJ string. The other endpoint also creates a new dictionary entry for the HU chunk.

It should be recognized that example data sizes are given as non-limiting examples and that any size dictionary reference and/or chunk may be used as desired.

In some embodiments, encryption may be applied to an ingress and/or egress 1-flow. Such encryption may take any desired form. Encryption may be applied inline. For example, encryption may include SSL encryption. Encryption may include TLS encryption. A process/processor/core may apply a same or different key (e.g., private and/or public key) on a per 1-flow basis. For example, data entering one endpoint of an 1-flow may be encrypted (e.g., using a public key). In some embodiments, data may exit the 1-flow in an encrypted form and be decrypted by the destination (e.g., using a private key). In some embodiments, When the data exits the other endpoint of the 1-flow, the data may be decrypted by the endpoint (e.g., using a private key). A different 1-flow may similarly be encrypted and decrypted using a different key and/or keys. Some example encryption algorithms and/or keys that may be supported include AES 128-SHA, AES256-SHA and RC4-MD5. For an AES based key, an endpoint may implement Intel's AES-NI instruction set for low latency and high throughput transmission. Offloading encryption to an SDN may allow analysis applications (e.g., packet capture, analytics, etc.) to operate on the traffic. Other embodiments may include encryption by a source and/or destination rather than offloading to the SDN. In such embodiments, content of data may be unknown to the SDN making some analysis application unavailable. Other analysis application may be able to operate on encrypted data without interference and/or may use a post-delivery reporting system to allow operation.

In some embodiments, an analytics application may be applied to an ingress and/or egress 1-flow. In some embodiments, 1-flow analytics may operate on packet headers only. Such analytics may allow for analysis to be performed regardless of encryption and/or compression offloading to an SDN. Other embodiments may include analytics of a payload, such as a packet capture mechanism. Processing may act inline and therefore not interfere with a data packet as it traverses the SDN. Such processing may be performed by placing a packet header in a buffer or queue of an analytics processor, core or process. That buffer may be a shared memory space with a process, processor or core that performs routing and/or transmission processes. For example, after a header/data packet is processed through an SDN endpoint or other node of an SDN, a packet header may be placed on a portion of a ring buffer or other queueing memory for processing by an analytics process. The analytics processing may take place off of the SDN routing process itself. This structure may ensure that post transmission analysis occurs without interfering with SDN packet flow.

Analytics information may be stored and may be queryable historically. Such querying may be performed from a device connected to the SDN to a non-routing system, such as a processor or database run by a computing system that is not involved with the routing of data through the SDN. Different levels of granularity may be retained for querying for different lengths of time. Different metrics may be retained for querying for different lengths of time. Example metrics that may be offered as analytics for an 1-flow may include bandwidth, error and/or latency information, such as: bandwidth (bits), throughput (packets), TCP retransmission (% of total packets), TCP retransmission (# of packets), TCP out of order packets (% of total packets), TCP out of order packets (# of packets), TCP active flow, application round trip time, TCP handshake latency, and so on. Analytics information may be streamed via a web socket and/or delivered in any desired manner.

In some embodiments, further analytics regarding an SDN and/or 1-flow performance may be available. An SDN may provide hundreds, thousands tens of thousands, and so on telemetry points for determining analytics data about data that is transmitted through the SDN. For example, each hop or node along any route through an SDN may act as a telemetry point. Custom metrics may be defined by a customer from any information that may be collected by such telemetry points. Some further example metrics may include SNMP metrics, Statsd metrics, Kstats metrics and so on.

In some embodiments, rather than analyzing the header, an entire data packet may be analyzed. Capture and/or analysis of a header and of a packet may operate in similar fashions.

Figure 17:
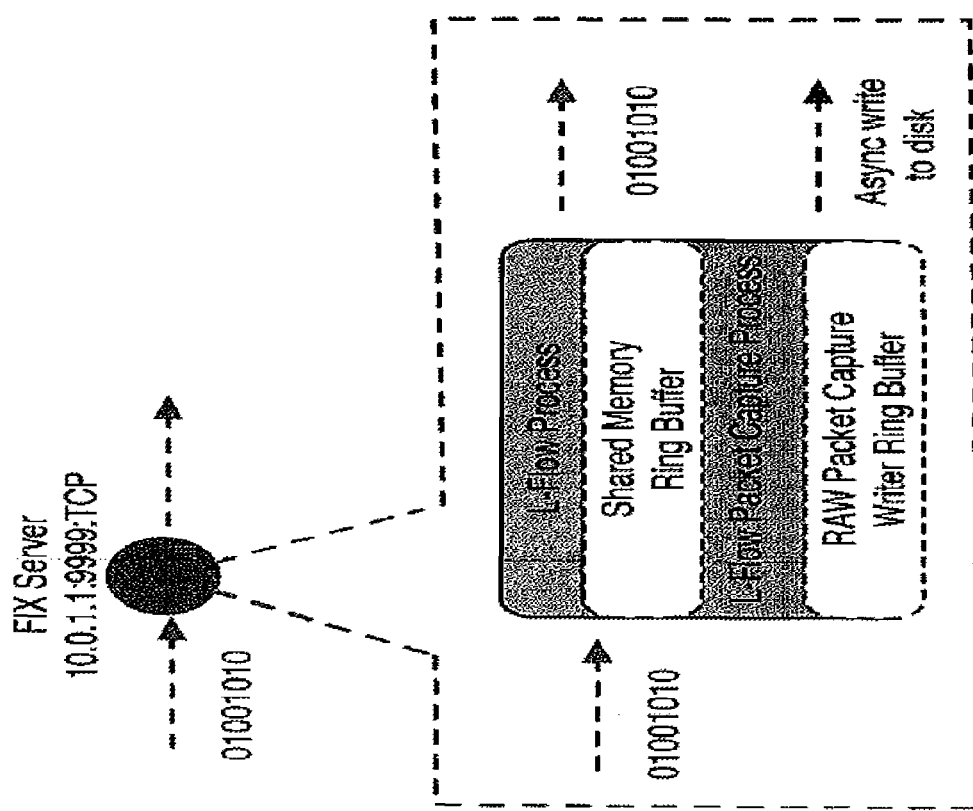
FIG. 17 shows an aspect of an example SDN according to some embodiments.
Figure 18:
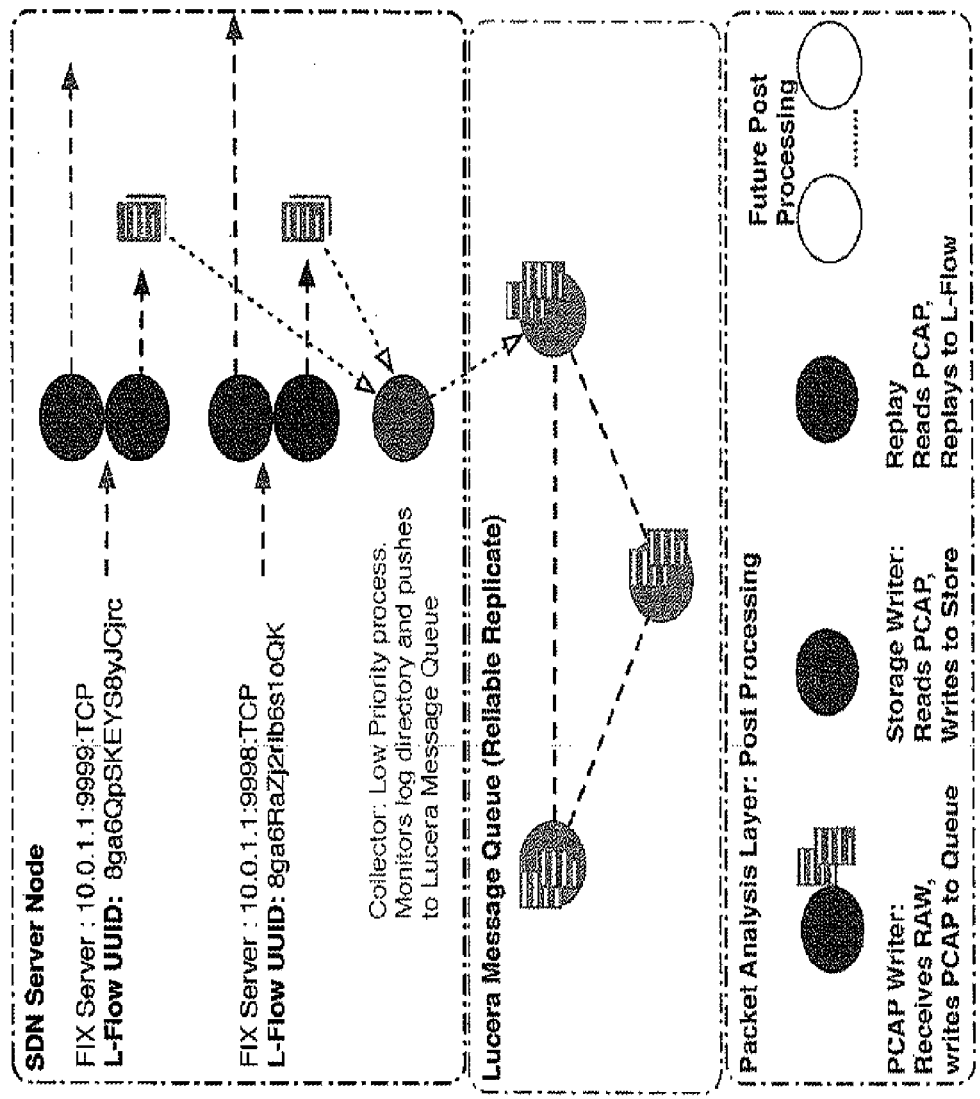
FIG. 18 shows an aspect of an example SDN according to some embodiments.

FIGS. 17 and 18 show an example structure of a packet and/or header capture and/or analysis arrangement that may be used in some embodiments. Such an arrangement may allow for analysis of captured packets and/or packet headers. The capture mechanism is organized as a virtual tap inside an 1-flow. The virtual tap implements a network packet broker to disseminate packet information as desired.

A memory space such as a ring buffer may be shared between two processes/processors/cores is shown in FIG. 17. For example, one process/processor/core may operate routing related to an 1-flow. Another may operate packet capture and/or other analytics or functions of an SDN. A packet may be entered into the buffer and processed by both processes/processors/cores. In some embodiments, both cores may access any element of a buffer to process the packets in the buffer. In some embodiments, a routing or 1-flow process/processor/core may access a first set of spaces and a packet capture process/processor/core may access a set of spaces. The first set of spaces may be higher priority than the second set of spaces. For example, in one embodiment, a packet capture process/processor/core may access a last space in a ring buffer before the space is over written with new data becoming the first space in the ring buffer. In such an embodiment, the routing or 1-flow process/processor/core may be given first priority to process the packet before the packet capture process/processor/core is allowed to act on the packet. In some embodiments, a packet capture process/processor/core may be limited in interrupting a routing or 1-flow access to a buffer, but a routing or 1-flow process/processor/core may be allowed to interrupt a packet capture process/processor/core. In this way, routing is held paramount and latency or data transfer is minimized.

In some embodiments, a packet capture process/processor/core may copy data from the shared memory to a writer buffer (e.g. another ring buffer). Such a buffer may be any size. One example size may be a 4 MB buffer. The buffer may store data that is queued to be written to a disk or otherwise acted upon by an analytical tool. In some embodiments, a packet capture process/processor/core may transmit captured packets to a collector agent or process or otherwise queue the packet for transmission by a low priority transmission process.

In some embodiments, post capture processing of the captured packets may be done away from the core routing elements of an SDN. For example, by processors that do not have any function related to the transmission and/or routing of data. For example, a collector agent may operate on such a non-routing processor. FIG. 18 illustrates the operation of such a collector agent and post processing away from the routing of an SDN. Copying of information from one location to another may be done in a reliable way to maintain data integrity. For example, a RAFT consensus algorithm m may be used to ensure reliable replication.

Packets may be timestamped with a trusted time source so analytics may properly recreate or analyze information about the packets. This timestamping may be part of a header. A GPS or CDMA clock source may be used for timestamping. This timestamping may also be used for order priority determination (e.g., price time priority order at an exchange service provider of an SDN).

In some embodiments, captured packets may be broadcast to a message queue that allows any application that subscribes to the queue to act on the captured packets. For example, a collector agent may push received packets to the message queue. Each 1-flow may be assigned a channel in a memory queue. So, packets captured from a particular 1-flow (e.g., at an endpoint, at a node within an SDN, etc.) may be broadcast on the assigned channel. Applications may listen for data on a particular channel and act on that data as desired.

An initial post-processing task may subscribe to 1-flow raw file outputs published on the message queue. The initial post processing task may publish back to the queue data that is reformatted from a raw packet capture to a desired format. One example format includes a PCAP format. Such formatted data may be then consumed by PCAP analysis applications as desired (e.g., Wireshark, TCPFlow). One example format includes <date><1-flow uuid><GMTSecond><data>. An initial post processing task may operate before other tasks. Operation of the initial post processing task may assign the data to a channel (e.g., by using the 1-flow uuid tags in the formatted re published data).

In response to formatted data being published in a message queue, post processing engines may act on the data as desired. For example, a post processing engine may be assigned (e.g., through an API) to provide analytics for packets from a particular 1-flow. When a packet tagged with that 1-flow's uuid or otherwise on that 1-flows channel of a message queue appears, the post processing engine may act to analyze the packet.

In some embodiments, a post processing engine may act to store a file. Such storage may include long or short term storage as desired. Data may be stored in a gzipped and index fashion on any desired storage medium. A post processing engine may act to provide a replay 1-flow activity. Packets may be received in post processing out of order and reordered to provide accurate information based on timestamps of the packets. Post processing may be used to perform any desired analytical analysis on a captured packet and/or header.

There are numerous examples of possible SDN functionality, including, for example, 1-Flow compression, encryption, packet capture, analytics, and so on functionality that may be provided in some embodiments in a variety of combinations. It should be recognized that such examples of functionality are non-limiting.

Figure 4:
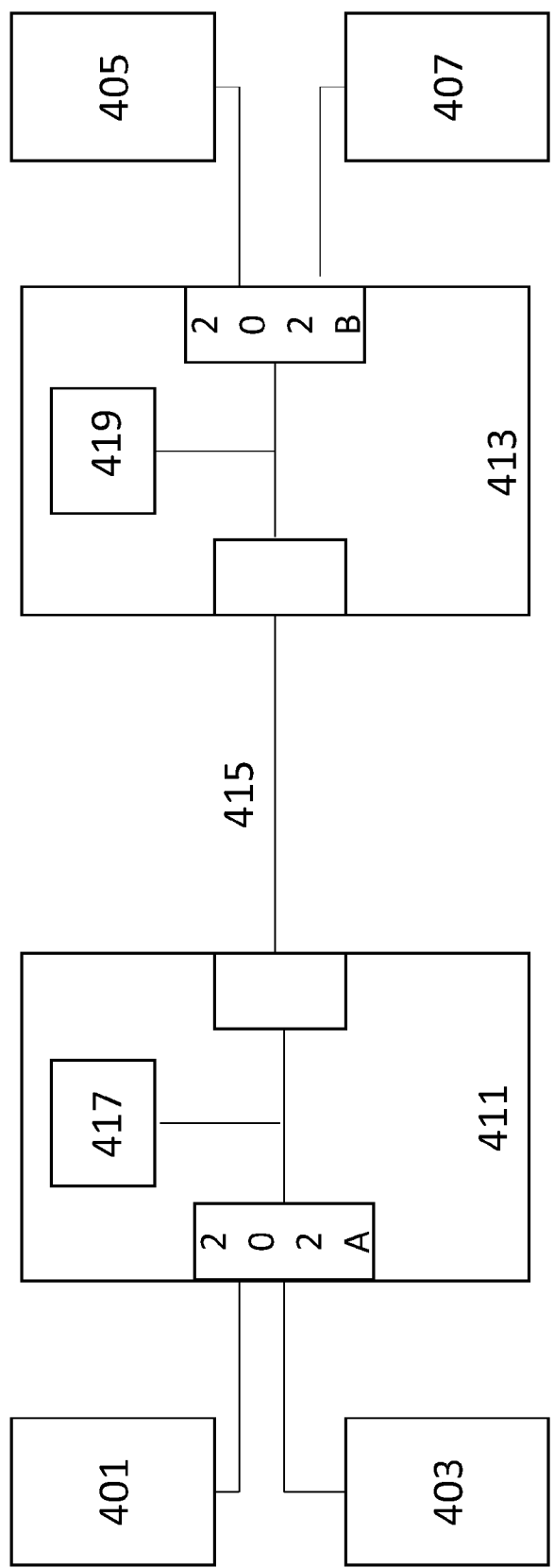
FIG. 4 shows an example SDN according to some embodiments.

FIG. 4 illustrates another example SDN that may be implemented in some embodiments. In this example, four SDN endpoints 401, 403, 405, and 407 (which may or may not correspond to customers 130 in prior figures) are illustrated to be connected to the SDN through two SDN network devices 202A and 202B. Each network device serves a separate data center of the SDN data center 411 and 413. The data centers may be connected through the SDN fabric, which is illustrated as internal networking elements and devices 415. Each datacenter is shown to have an internal SDN endpoint and/or other service provider indicated by 417 and 419 (e.g., which may or may not correspond to elements such as 114 in prior figures). It should be recognized that this example is given as a non-limiting example to illustrate some possible functionalities and/or arrangements of some embodiments. Some embodiments may have different arrangements, elements, functionality, and so on.

In a cloud based and/or distributed high speed trading network, various endpoints and/or participants may offer services to other endpoints and/or participants to facilitate trading though the SDN. For examples, as a non-limiting example setup, endpoints 405 and 407 may offer market data services to SDN participants, endpoint 401 may offer exchange services to SDN participants, and endpoint 403 may be a trading entity that utilizes the distributed services of the SDN.

A customer at endpoint 403 may access a market data 1-flow to each of endpoints 405 and 407 by accessing an IP address and port combination assigned by the SDN to those services for the endpoint 403. Services at endpoints 405 and 407 may communicate back through the SDN to a customer at endpoint 403 to provide market data information. Similarly, endpoint 403 may communicate through the SDN to endpoint 401 to provide trading commands (e.g., bids, offers).

Internal services such as an endpoint 417 may provide services similarly to an external endpoint. For example, an internal service may provide exchange functionality. That internal service may be accessed similarly to an external service (e.g., with a port and IP pair). In some embodiments, an endpoint may be unaware if they are accessing an internal endpoint or an external endpoint because access to both may be identical (e.g., with different ports and/or IP addresses, and/or API commands).

Network changes at any of these endpoints may be accounted for by the SDN. Elements attached to the SDN may appear to other elements attached to the SDN as a single network space. However, the elements may actually be disparately connected and physically separate. The SDN may abstract these physical differences allowing endpoints to logically view one another as connected devices. This arrangement may allow for high speed and/or low latency communication of market data from these SDN attached services to an SDN attached trading entity.

An element of the SDN such as element 419 may provide control over components of the SDN to facilitate SDN functionality. For example, a controller 419 may direct elements of the SDN on how to route and/or process packets revived by the SDN. For example, cores 302 and/or applications 303 may be controlled to respond to data as desired by the SDN (e.g., route according the SDN structure, ignore when relevant, encrypt or compress when desired, analyze and/or capture when desired).

For example, for customer 403, the SDN may control a network application running on a dedicate core to customer 403 in network device 202A to enable routes to each of the 401, 405 and 407 endpoints. Routes to other endpoints may be disabled for that customer by the SDN controller. Those routes may later be opened and/or opened routes may later be closed. For example, if a new exchange system attaches to the SDN, a new route to that system may be established at an IP and port pair that becomes accessible to the customer. As another example, if a customer does not pay a subscription fee for market data, a market data endpoint may become inaccessible and a route may no longer be open to the customer at 403. A control element 419 may receive various input about such route changes and control an application such as 303A on core 302A to process packets in accordance with such network changes.

As another example, a customer may request data encryption, data compression, data analytics, packet capture, etc. for access to a service. Such a request may be made through a controller 419 and/or directly through an API accessible with a network application (e.g., 303A). The application may then process and/or be controlled to process packets in accordance with that request.

Control and/or application of services such as encryption, compression, load balancing, etc. may happen at a variety of locations and/or by a variety of entities. For example, a customer may indicate to an API of a SDN (e.g., a SDN control element 419 and/or a core/application of element 220) that communication in a particular 1-flow with a market data source should be compressed. The SDN may control components of the SDN (e.g., by communication among APIs of SDN (e.g., a core/application at each end of the 1-flow) to apply the requested compression to data as it passes through. Such compression may be applied from endpoint to endpoint in an 1-flow in some embodiments. In other embodiments such compression may be applied to hops of an 1-flow (e.g., within the SDN fabric). It should be recognized that encryption functionality may operate in a similar fashion with an endpoint identifying encryption to be used with an 1-flow and one or more components of the SDN operating to apply the identified encryption.

As another example, load balancing may be controlled at an 1-flow by direction from a service provider. For example, an egress 1-flow providing exchange services may identify that load balancing should happen in a round robin fashion (e.g., by using an SDN API to an SDN controller or other element of the SDN such as a core or application that controls routing in a device like element 220). One or more elements of an SDN may be controlled to facilitate the identified load balancing. For example, a core connected to an exchange may be controlled to route every other packet that reaches that core to a different destination according to a load balancing formula. A user of the service and even the service itself may be unaware of the actual adjustment to the network routing as the SDN takes care of the load balancing.

As another example, analytics and/or packet capture may similarly be applied and/or controlled at an 1-flow level. An endpoint may identify a desired analysis and/or capture to be applied to a particular 1-flow. An SDN may determine how to and/or where to apply the desired capture and/or analytic. For example, a core that connects a service to the SDN may operate to capture packets and/or apply an analytic to packets. As another example, cores of end points that user a service may operate to apply an analytic and/or capture packets of users of the service to packets. An SDN may determine where and how to apply that capture and/or analytic and control cores to apply it as requested by an endpoint (e.g., by directing cores/application to perform actions on packet with certain characteristics as they pass through the SDN).

Again, it should be recognized that these examples, structures, and functionality are given as non-limiting examples only.

The following sections provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates many things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms Of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples And Terminology Are Not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. §1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any non-transitory medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

VIII. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. An apparatus comprising:
    a first routing device configured to direct traffic on a first network that is addressed to a local address and port pair of the first network to a destination on a remote second network and to direct traffic on a third network that is addressed to a local address and port pair of the third network to the destination on the remote second network, in which the first routing device is configured such that a first core of a first processor is configured to perform routing for the first network, and a second core of the first processor is configured to perform routing for the third network;
    in which, to facilitate mapping the local address and port pair of the first network to the destination, the routing device is configured to open a first socket to the destination, open a second socket to a second destination, load balance traffic addressed to the local address and port pair of the first network such that the traffic is split between the destination using the first socket and the second destination using the second socket, and fail over routing to the second socket in response to a determination that the first socket has failed;
    in which a third core of the routing device is configured to execute a process configured to access a portion of a memory space shared with the first core, copy at least one of a packet header and an entire packet from the portion of the memory space, and facilitate transmission of the at least one of the packet header and the entire packet to an analytics engine coupled to the first routing device while the first core routes the entire packet to the destination.

2. The apparatus of claim 1, in which the load balancing occurs in at least one of a round robin and a least connected manner.

3. The apparatus of claim 1, in which the routing device include multiple multi-core processors.

4. The apparatus of claim 1, in which the routing device is configured to route data at Gigabit speeds.

5. The apparatus of claim 1, comprising:
    a second routing device configured to map an address and port pair to the first network and to map a second address and port pair to the second network, in which the second routing device is configured such that a first core of a second processor is configured to perform routing to the first network from the destination and a second core of the second processor is configured to perform routing to the second network from the destination.

6. The apparatus of claim 5, in which the first routing device is configured to compress blocks of data routed to the destination according to a dictionary scheme, and the second routing device is configured to decompress the blocks of data according to the dictionary scheme for transmission to the destination.

7. The apparatus of claim 5, in which mapping through the first routing device from the first network and second network enables services from the first network and second network to a software defined network.

8. The apparatus of claim 5 in which the second routing device enables the destination to subscribe to services offered to a software defined network from the first network and second network.

9. The apparatus of claim 5, in which the first routing device and the second routing device define a software defined network that spans a plurality of remote data centers.

10. The apparatus of claim 5, in which the destination includes a trading customer and the first network includes a network on which an electronic financial exchange resides.

* * * * *